(12) United States Patent
Hirata et al.

(10) Patent No.: US 9,302,641 B2
(45) Date of Patent: Apr. 5, 2016

(54) SEATBACK BAR STRUCTURE OF VEHICLE

(71) Applicant: MAZDA MOTOR CORPORATION, Hiroshima (JP)

(72) Inventors: Ryotaro Hirata, Higashihiroshima (JP); Kei Uchibori, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/560,282

(22) Filed: Dec. 4, 2014

(65) Prior Publication Data
US 2015/0158449 A1 Jun. 11, 2015

(30) Foreign Application Priority Data
Dec. 5, 2013 (JP) .................................. 2013-252127

(51) Int. Cl.
B60R 21/13 (2006.01)
(52) U.S. Cl.
CPC ........... *B60R 21/13* (2013.01); *B60R 2021/132* (2013.01)
(58) Field of Classification Search
CPC .................... B60R 21/13; B60R 2021/132
See application file for complete search history.

(56) References Cited

U.S. PATENT DOCUMENTS

| 7,481,476 | B2 * | 1/2009 | Heiss et al. | 296/24.43 |
| 2005/0140129 | A1 * | 6/2005 | Miki et al. | 280/756 |
| 2005/0212277 | A1 * | 9/2005 | Hamamoto et al. | 280/756 |
| 2006/0273629 | A1 * | 12/2006 | Heiss et al. | 296/203.01 |
| 2008/0061542 | A1 * | 3/2008 | Froschle et al. | 280/756 |
| 2010/0078925 | A1 * | 4/2010 | Froschle | 280/756 |

FOREIGN PATENT DOCUMENTS

JP H05-058240 A 3/1993

* cited by examiner

*Primary Examiner* — Drew Brown
(74) *Attorney, Agent, or Firm* — Studebaker & Brackett PC

(57) ABSTRACT

A guard bar has an inverse-U shape, and its inward end portion is configured to pass through a cross bar and be welded to the cross bar and its outward end portion is fixed to the cross bar via a junction member. The junction member has a reinforcement portion which is fastened together with a link bracket and the cross bar. Thus, there can be provided a seatback bar structure of a vehicle which can properly attach the guard bar, considering the manufacturing accuracy of extrusion molding of aluminum or aluminum alloy, and also can properly transmit a load inputted to the guard bar in a vehicle's rollover to a leg portion and side panels so as to achieve appropriate load dispersion.

16 Claims, 16 Drawing Sheets

SEATBACK BAR STRUCTURE OF VEHICLE

BACKGROUND OF THE INVENTION

The present invention relates to a seatback bar structure of a vehicle, and particularly to the seatback bar structure of the vehicle having a vehicle body provided with side panels constituting right-and-left vehicle-body side walls and a floor panel arranged between the right-and-left side panels, interconnecting the side panels, and forming a vehicle floor face, comprising a cross bar extending in a vehicle width direction above the floor panel, a leg portion connecting the cross bar and the floor panel, a guard bar fixed to an upper portion of the cross bar and made from aluminum or aluminum alloy by extrusion molding, and a link bracket, one end of which is fixed to the side panel and the other end of which is connected to the cross bar.

In general, a recent open car has an inverse-U shaped guard bar arranged in back of a vehicle seat to protect a passenger's head portion in a vehicle's rollover. This inverse-U shaped guard bar has the function to transmit a load generated in the vehicle's rollover to a floor panel so as to retrain its own deformation through efficient transmission of the load, so that a survival space of the passenger can be secured properly. Further, the open car adopts a seatback bar structure to transmit a load generated in a vehicle's side collision in a vehicle width direction because it has no roof, particularly no roof reinforcement.

Herein, the seatback bar structure is a general term for a united structure comprising a cross bar which is arranged in back of the vehicle seat and extends in the vehicle width direction, interconnecting right-and-left side panels above the floor panel, a leg portion which connects a lower portion of the cross bar and the floor panel, and a guard bar which is fixed to an upper portion of the cross bar. It can be considered that any of the cross bar, the leg portion and the guard bar (at least the guard bar among them) is made from aluminum or aluminum alloy to achieve further light-weighting of the vehicle.

In this case, it may be considered that the aluminum-made or aluminum-alloy-made guard bar is formed in the inverse-U shape by bending forming after extrusion molding, and both end portions, in the vehicle width direction, of the U-shaped guard bar are configured to pass through and fixed to penetration holes formed at the cross bar. However, this structure has a problem in that the manufacturing accuracy of the guard bar may deteriorate because the bending forming is applied to the guard bar after the extrusion molding, so that it may be difficult to attach the guard bar to the penetration holes of the cross bar.

Japanese Patent Laid-Open Publication No. H5-58240 discloses a seatback bar structure in which a pair of symmetrical and inverse-U shaped guard bars are provided at an upper portion of a cross bar. This guard bar is made by bending a steel pipe and therefore it may not be appropriate in achieving light weighting of the vehicle. Herein, it is considered that the guard bar is made from aluminum or aluminum alloy by extrusion molding or bending forming. However, in this case, there is a problem in attaching as described above.

SUMMARY OF THE INVENTION

Accordingly, an object of the present invention is to provide a seatback bar structure of a vehicle which can properly attach the guard bar, considering the manufacturing accuracy of the extrusion molding of aluminum or aluminum alloy, and also can properly transmit the load inputted to the guard bar in the vehicle's rollover to the leg portion and the side panels so as to achieve appropriate load dispersion.

According to the present invention, there is provided a seatback bar structure of a vehicle having a vehicle body provided with side panels constituting right-and-left vehicle-body side walls and a floor panel arranged between the right-and-left side panels, interconnecting the side panels, and forming a vehicle floor face, comprising a cross bar extending in a vehicle width direction above the floor panel, a leg portion connecting the cross bar and the floor panel, a guard bar fixed to an upper portion of the cross bar, the guard bar being made from aluminum or aluminum alloy by extrusion molding, and a link bracket, one end of which is fixed to the side panel and the other end of which is connected to the cross bar, wherein the guard bar has an inverse-U shape, and an inward end portion, in the vehicle width direction, thereof is configured to pass through the cross bar and be welded to the cross bar and an outward end portion, in the vehicle width direction, thereof is fixed to the cross bar via a junction member, and the junction member has a reinforcement portion which is fastened together with the link bracket and the cross bar.

According to the present invention, since the inward end portion, in the vehicle width direction, of the guard bar is configured to pass through the cross bar and be welded to the cross bar and also the outward end portion, in the vehicle width direction, of the guard bar is fixed to the cross bar via the junction member, an appropriate attachment of the guard bar, considering the manufacturing accuracy of the extrusion molding of aluminum or aluminum alloy, can be achieved. Further, since the reinforcement portion of the junction member is fastened together with the link bracket and the cross bar, the load inputted to the guard bar in the vehicle's rollover can be transmitted from the guard bar to the leg portion by way of the junction member and the cross bar, and also to the side panels by way of the link bracket. Thus, load transmission both to the leg portion and the side panels can be conducted, so that appropriate load dispersion can be achieved.

According to an embodiment of the present invention, the junction member has a falling-prevention portion which extends upward from a rear portion of an attachment face thereof where the guard bar is attached, and the falling-prevention portion is configured to contact a rear face of the guard bar. Thereby, when the load is inputted to the guard bar in the vehicle's rollover, the guard bar can be prevented from falling down rearward by the falling-prevention portion.

According to another embodiment of the present invention, the link bracket is configured to pass through the cross bar up to a position which overlaps the outward end portion, in the vehicle width direction, of the guard bar in a plan view, and the reinforcement portion of the junction member, the cross bar, and the link bracket are fastened at plural fastening portions spaced apart from each other in the vehicle width direction. Thereby, since the reinforcement portion of the junction member, the cross bar, and the link bracket are fastened at the plural fastening portions, the sufficient fastening strength of these three members can be ensured, so that the input load in the vehicle's rollover can be transmitted to the leg portion and the link bracket by way of the guard bar, the junction member, and the cross bar so as to achieve the appropriate load dispersion and also the input load in the vehicle's side collision can be transmitted in an opposite direction in the vehicle width direction by way of the side panel, the link bracket, and the cross bar so as to achieve the appropriate load dispersion.

Herein, it may be further preferable that an embodiment of the present invention be configured as below.

That is, the leg portion is fixed to a lower portion of said cross bar at a position in the vehicle width direction where the outward end portion of the guard bar is fixed to the cross bar, and a steel bracket to connect the leg portion and the cross bar is provided.

Further, the cross bar is made from aluminum or aluminum alloy by extrusion molding, the cross bar has a first rib which forms a thick portion at an interconnection portion with an upper face portion of the cross bar, partitions a substantially triangular closed-cross section from a main closed-cross section thereof, and fixes a rear portion of the guard bar at a position corresponding to the above-described thick portion, and the cross bar further has a second rib which partitions the main closed cross section thereof vertically and forms a sub closed-cross section at a position corresponding to a fixation position of the leg portion.

Other features, aspects, and advantages of the present invention will become apparent from the following description which refers to the accompanying drawings.

DETAILED DESCRIPTION OF THE INVENTION

Figure 1:
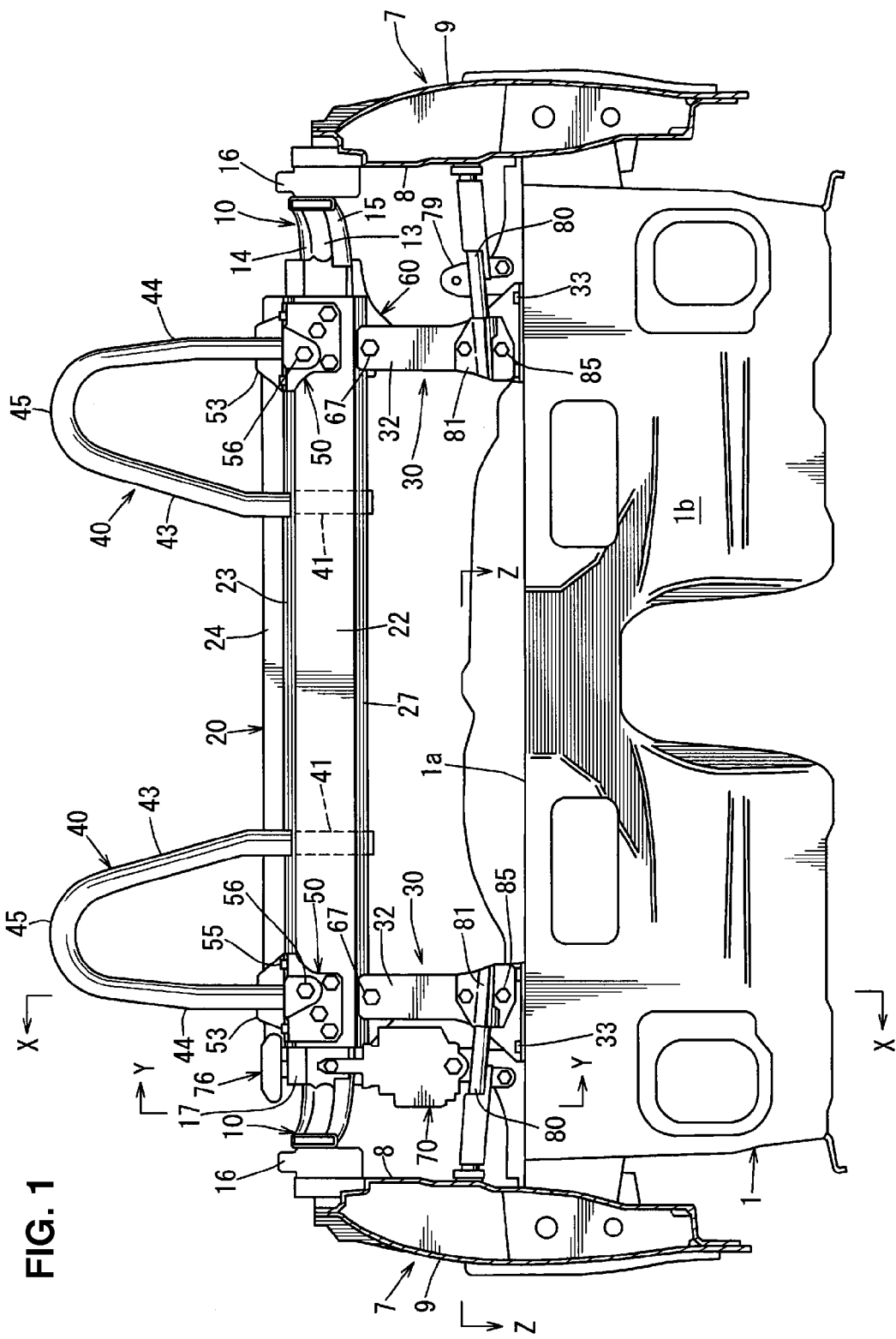
FIG. 1 is an elevational view showing a seatback bar structure of a vehicle of the present invention.

Hereinafter, a preferred embodiment of the present invention will be described referring to the accompanying drawings. Figures show a seatback bar structure of a vehicle (open car). FIG. 1 is its elevational view, FIG. 2 is its back view, FIG. 3 is a sectional view taken along line X-X of FIG. 1, and FIGS. 4-6 are perspective views of its major portion, when viewed from different directions, respectively.

[Vehicle-Body Structure]

Figure 2:
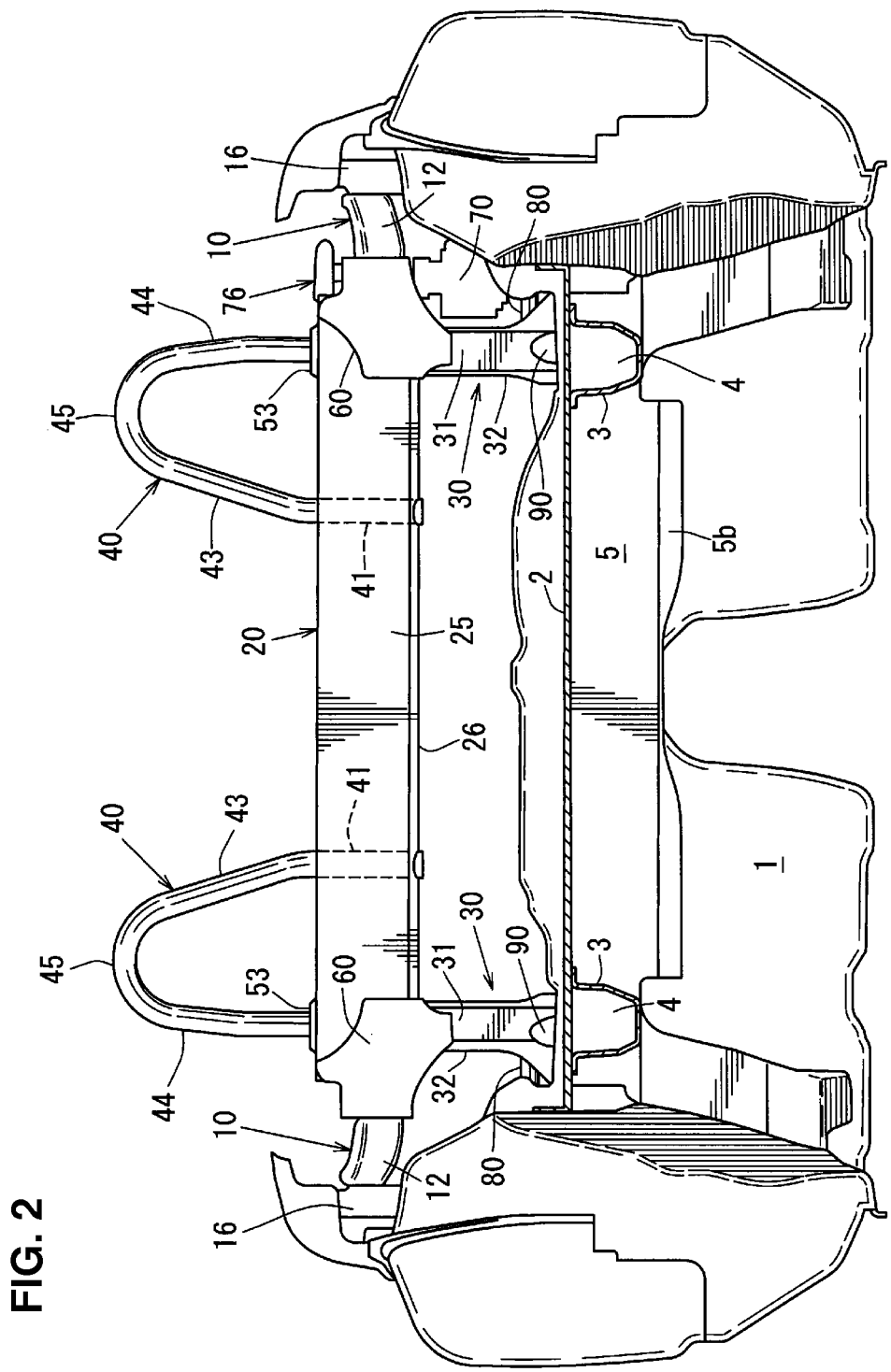
FIG. 2 is a back view of the seatback bar structure of a vehicle.
Figure 3:
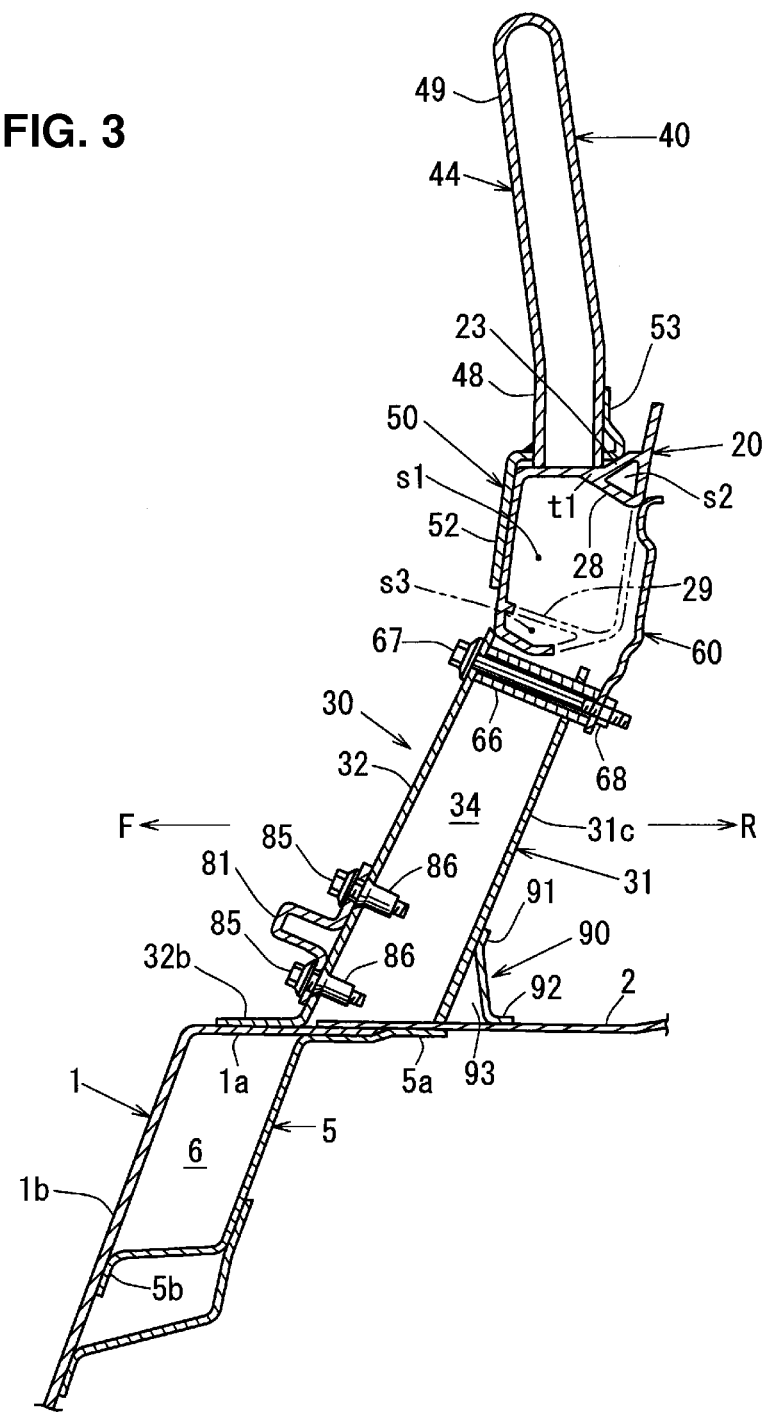
FIG. 3 is a sectional view taken along line X-X of FIG. 1.

In FIGS. 1-3, at a rear portion of a front floor panel, not illustrated, is provided a bulkhead 1 which rises upward and rearward from the front floor panel, and an upper face portion 1a of the bulkhead 1 extends rearward horizontally.

Further, a rear floor 2 (specifically, a rear floor panel) as a floor panel is provided such that it extends rearward substantially horizontally and its front end portion overlaps a rear end portion of the upper face portion 1a of the bulkhead 1. As shown in FIG. 2, a pair of right-and-left rear side frames 3, 3 which extend in a vehicle longitudinal direction are jointly fixed to lower portions of both sides, in a vehicle width direction, of the rear floor 2, so that closed cross sections 4 which extend in the vehicle longitudinal direction are formed between the rear side frames 3, 3 and the rear floor 2. Thereby, the rigidity of a lower vehicle body is improved.

Further, as shown in FIGS. 2 and 3, a rear cross member 5 (a so-called No. 3 cross member) which extends in the vehicle width direction is jointly fixed to an overlap portion of the rear end portion 1a of the bulkhead 1 and a vertical face portion 1b of the bulkhead 1 via its upper and lower flanges 5a, 5b. Thereby, a closed cross section 6 which extends in the vehicle longitudinal direction is formed between the bulkhead 1 and the rear cross member 5, so that the rigidity of the vehicle body is improved.

Meanwhile, as shown in FIG. 1, a pair of center pillars 7 as a pair of side panels which form right and left vehicle-body side walls are provided at both outward sides, in the vehicle width direction, of the bulkhead 1. The center pillar 7 comprises a center pillar inner 8 and a center pillar outer 9, which is a vehicle-body reinforcing member having a center-pillar closed cross section extending vertically. Herein, the rear floor 2 is a floor panel which is arranged between the right-and-left center pillar inners 8, 8 and interconnects the center pillar inners 8, 8 so as to form a vehicle floor face (a folding-top storage portion and a baggage-room floor face).

[Abstract of Seatback Bar Structure]

As shown in FIGS. 1-3, a cross bar 20 which extends in the vehicle width direction and interconnects the center pillar inners 8, 8 via link brackets 10 and spacer brackets 16 is provided above the rear floor 2. The cross bar 20 extending in the vehicle width direction which is provided in back of rear seats of the vehicle is made from aluminum or aluminum alloy by extrusion molding.

Further, as shown in FIGS. 1-3, a pair of right-and-left leg portions 30, 30 which connect a lower portion of the cross bar 20 and the rear floor 2 are provided, and a pair of right-and-left guard bars 40, 40 which are fixed to an upper portion of the cross bar 20 are provided. A seatback bar structure is constituted by the cross bar 20, the leg portions 30, and the guard bars 40.

As shown in FIGS. 1 and 2, the above-described guard bars 40 are provided symmetrically, corresponding to a driver-seat rear-portion side and a passenger-seat rear-portion side, and formed in an inverse-U shape in the elevational view.

Further, as shown in FIG. 3, the cross bar 20 is arranged at a middle level, the guard bars 40 are provided above the upper portion of the cross bar 20, and the leg portions 30 are provided below the cross bar 20. The leg portion 30 is provided such that its lower portion is positioned forward of its upper portion, and the guard bar 40 is provided such that its upper portion is positioned forward of its lower portion. Thus, these three members 40, 20, 30 are arranged in a bending shape in a side view as shown in FIG. 3. This bending-shaped arrangement corresponds to a shape of a back face of a seatback of the vehicle's seat. In particular, a forward-slant structure of the guard bar 40 is a layout for avoiding any interference of the guard bar 40 with a folding top which constitutes a movable roof of the open car when the folding top is folded.

[Structure of Cross Bar]

Figure 4:
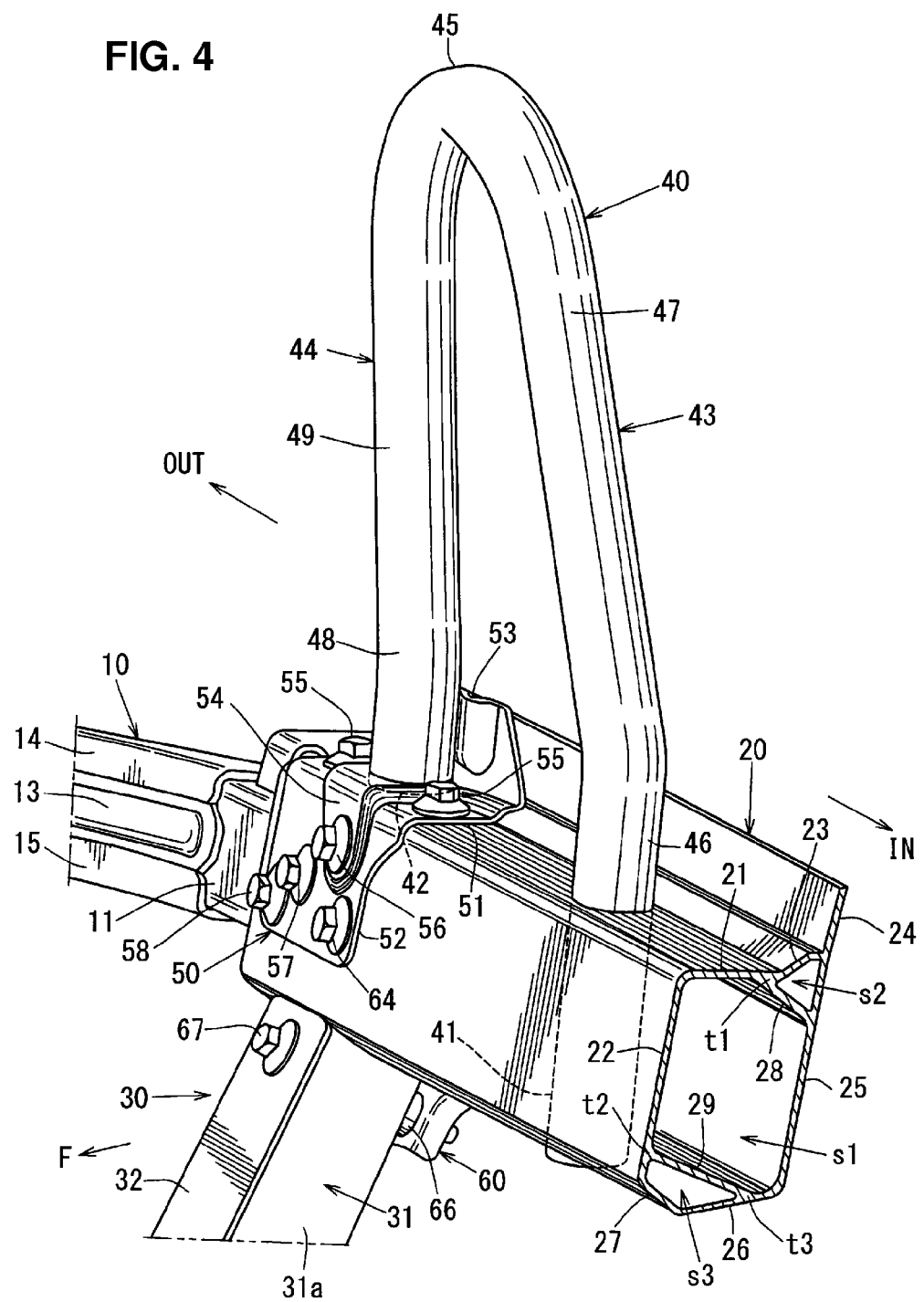
FIG. 4 is a perspective view showing a major portion, when viewed from vehicle's left and front side.

As shown in FIG. 4, the cross bar 20 is made from aluminum or aluminum alloy by extrusion molding, and comprises an upper face portion 21, a front face portion 22 which extends downward from a front end of the upper face portion 21, a slant piece portion 23 which extends rearward and upward from a rear portion of the upper face portion 21, an upper piece portion 24 which extends upward from a rear end of the slant piece portion 23, a rear face portion 25 which extends downward from the rear end of the slant piece portion 23, a rear bottom face portion 26 which extends just downward from a lower end of the rear face portion 25, and a front bottom face portion 27 which extends just upward from a front end of the rear bottom face portion 26. Further, the cross bar 20 has a main closed-cross section s1 and a triangular closed-cross section s2 which is formed above the main closed-cross section s1. The cross bar 20 further has an upper rib 28 as a first rib, which forms a thick portion t1 at an interconnection portion with the upper face portion 21 of the cross bar 20, partitions the triangular closed-cross section s2 from the main closed-cross section s1, and fixes a rear portion of the guard bar 40 at a position corresponding to the above-described thick portion t1 (see FIG. 3).

That is, as shown in FIG. 3, the thick portion t1 is formed to overlap the rear portion of the guard bar 40 in a plan view. As shown in FIGS. 3 and 4, the cross bar 20 further has a lower rib 29 as a second rib, which partitions the main closed cross section s1 vertically and forms a sub closed-cross section s3 at a position corresponding to a fixation position of the leg portion 30. A thick portion t2 is formed at an intersection portion of the lower rib 29 and the front face portion 22. Likewise, a thick portion t3 is formed at an intersection portion of the lower rib 29 and the rear bottom face portion 26. The upper rib 28 and the lower rib 29 are formed inside the cross section of the cross bar 20 so that a load generated in a vehicle's side collision can be transmitted in an opposite direction by way of the cross bar 20 so as to achieve load dispersion.

Further, as shown in FIG. 3, the thick portion t1 and the rear portion of the guard bar 40 are arranged to correspond to each other so that the resistance against the load inputted in a vehicle's rollover can be improved without providing any reinforcing member and thereby light-weighting of the vehicle can be achieved.

Also, as shown in FIG. 3, the lower rib 29 at a lower portion of the cross section of the cross bar 20 is arranged to face the log portion 30 so that longitudinal opening-deformation of the lower portion of the cross bar 20, which may caused in the vehicle's rollover, can be restrained and thereby the performance of transmitting the input load to the leg portion 30 can be improved. Additionally, the triangular closed-cross section s2 which is enclosed by the rear slant piece portion 23, the rear face portion 25, and the upper rib 28 is formed at an upper portion of the main closed-cross section s1 so that the rigidity of the cross bar 20 can be increased by this truss shape so as to improve the resistance against the vehicle's side collision and thereby the load generated in the vehicle's side collision can be transmitted in the opposite direction so as to achieve the load dispersion.

[Structure of Guard Bar]

As shown in FIGS. 3 and 4, the guard bar 40 is formed in the inverse-U shape by bending forming after extrusion molding of aluminum or aluminum alloy, and an inward end portion 41, in the vehicle width direction, of the guard bar 40 is configured to pass through the cross bar 20 and be welded to the cross bar 20. The other end of the guard bar 40, i.e., an outward end portion 42, in the vehicle width direction, of the guard bar 40 is configured to be welded to an aluminum-made or aluminum-alloy-made junction member 50, and therefore fixed to the cross bar 20 via the junction member 50.

That is, while there is a concern about the manufacturing accuracy when the guard bar 40 is formed by extrusion molding of aluminum or aluminum alloy for the light-weighting, the inward end portion 41 of the guard bar 40 is configured to pass through the cross bar 20 and also the outward end portion 42 of the guard bar 40 is configured to be fixed to the cross bar 20 via the junction member 50 so that attaching of the guard bar 40, considering the manufacturing accuracy of the extrusion molding or the bending forming, can be properly achieved.

Further, the guard bar 40 comprises an inward piece 43 which is positioned on an inward side in the vehicle width direction and an outward piece 44 which is positioned on an outward side in the vehicle width direction, which are connected to each other via an upper-end curve portion 45 so as to form the guard bar 40 in an inverse-U shape.

As shown in FIGS. 3 and 4, the above-described inward piece 43 includes a standing portion 46 which stands perpendicularly to the upper-face portion 21 as the upper face of the cross bar 20 and a slant portion 47 which slants forward from the standing portion 46. The above-described outward piece 44 includes a contacting portion 48 which contacts perpendicularly to the upper-face portion 21 as the upper face of the cross bar 20 and a slant portion 49 which slants forward from the contacting portion 48.

As shown in FIG. 1, the outward piece 44 of the guard bar 40 is fixed such that it extends vertically, aligning with the leg portion 30 in the elevational view, so that the load generated in the vehicle's rollover can be efficiently transmitted to the leg portion 30.

Moreover, as shown in FIGS. 3 and 4, the slant piece portion 23 which constitutes one side of the triangular closed-cross section s2 of the cross bar 20 forms the upper face of the cross bar 20, and this one side, i.e., the slant piece portion 23 is formed substantially perpendicularly to the slant portion 49 of the guard bar 40 so that the guard bar 40 can be restrained from leaning rearward in the vehicle's rollover.

[Related Structure of Cross Bar, Guard Bar, Link Bracket and Steel Bracket]

Figure 7:
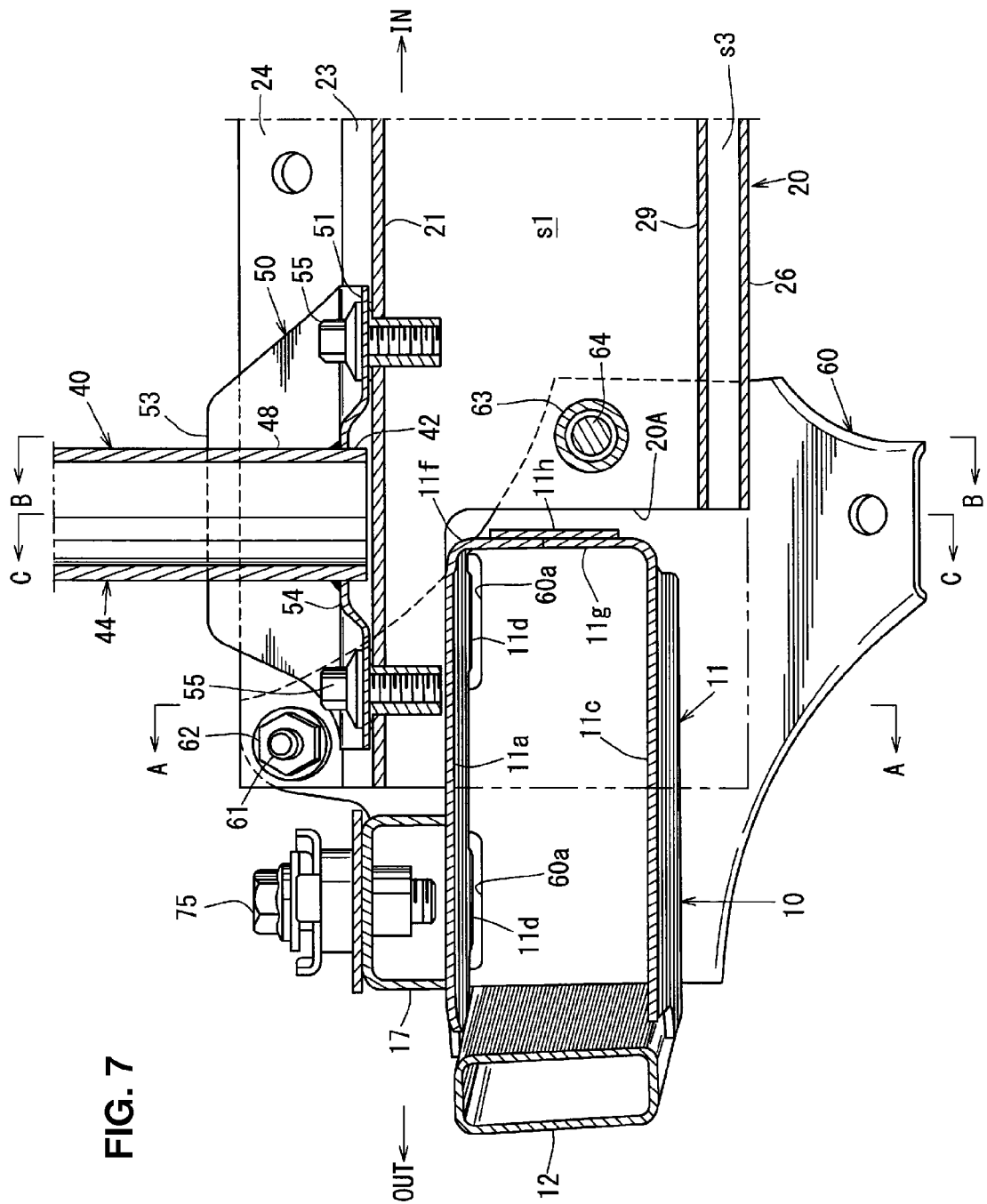
FIG. 7 is an elevational view showing a related structure of a cross bar, a guard bar, a link bracket, and a steel bracket.
Figure 8:
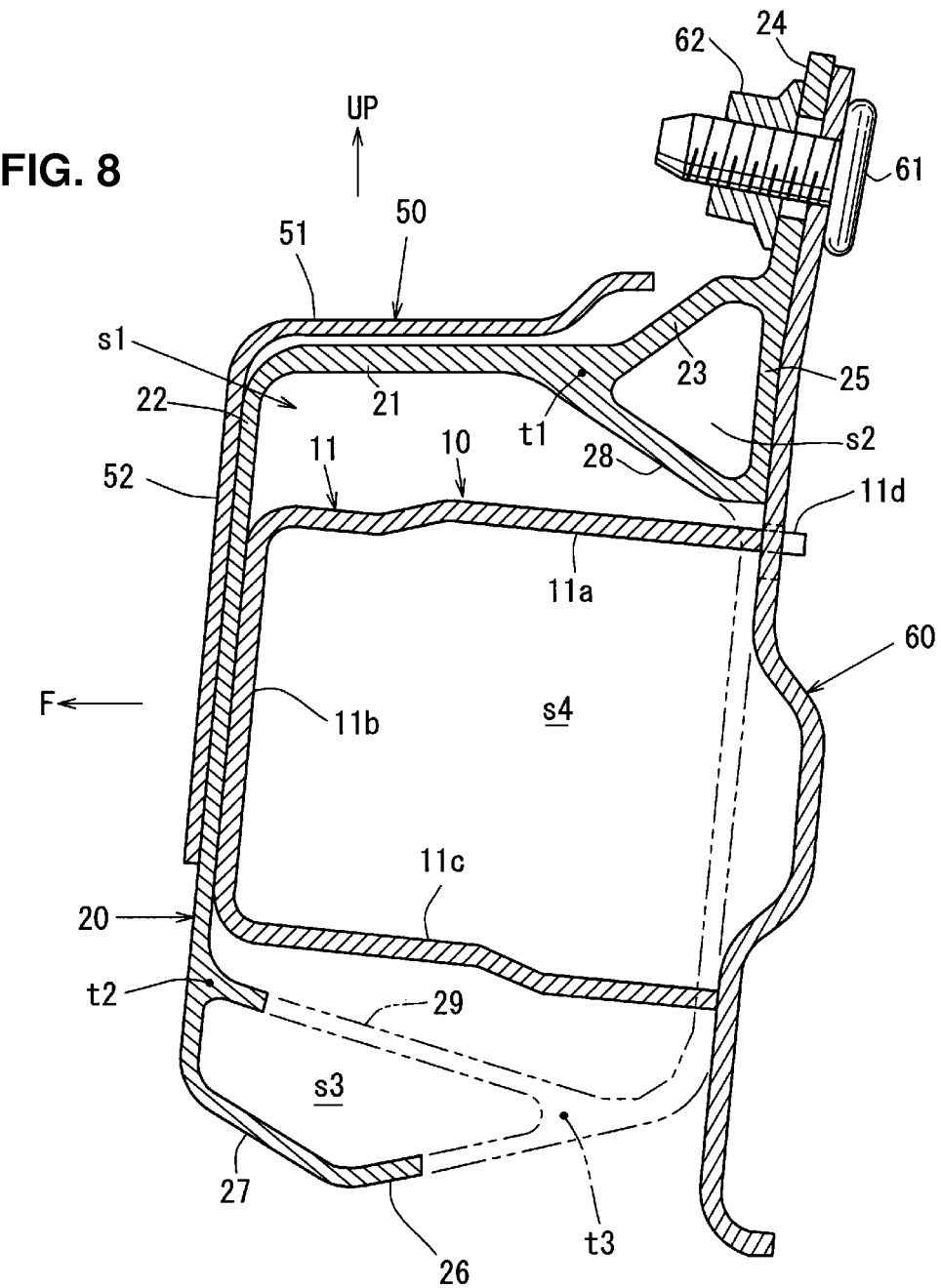
FIG. 8 is a sectional view taken along line A-A of FIG. 7.
Figure 9:
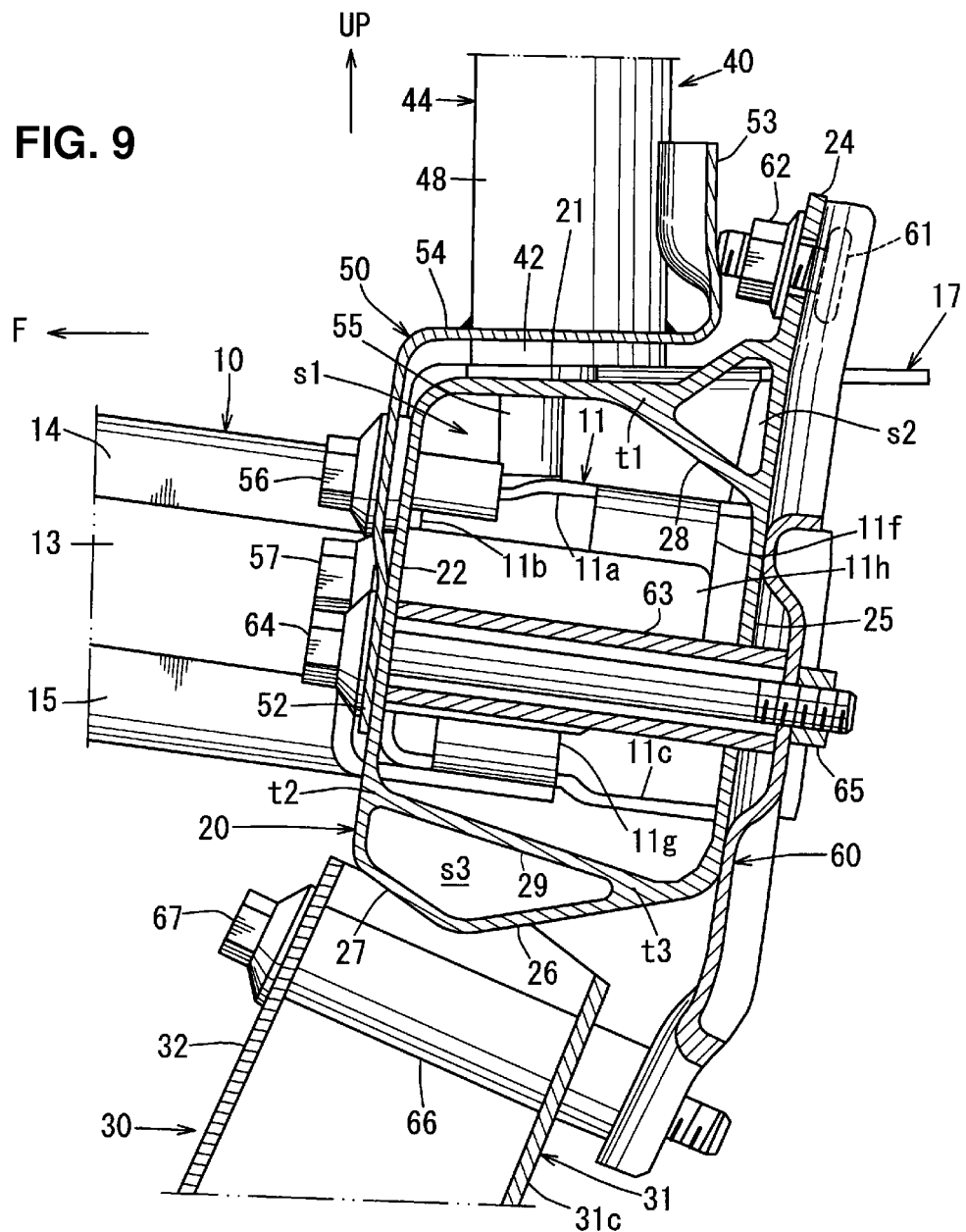
FIG. 9 is a sectional view taken along line B-B of FIG. 7.
Figure 10:
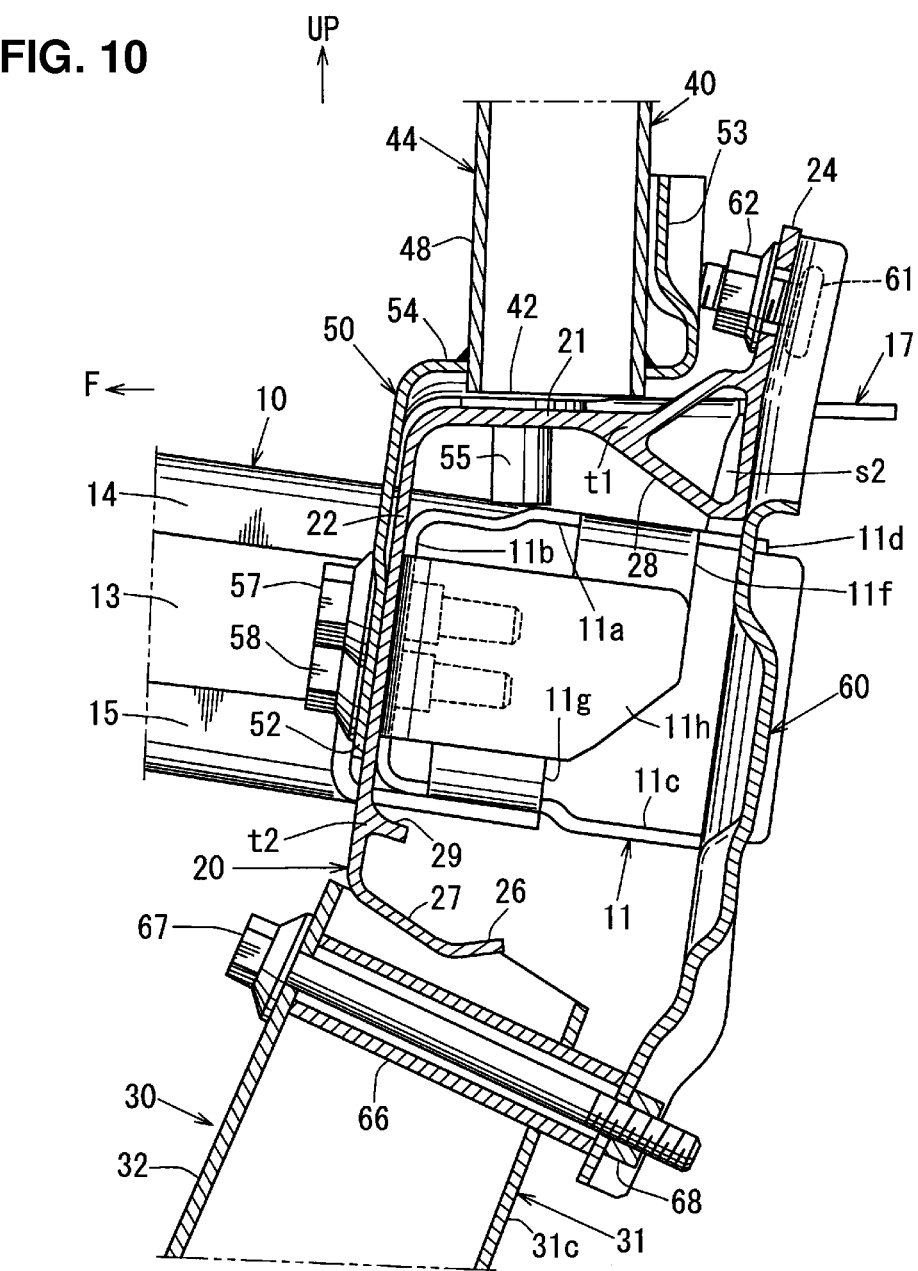
FIG. 10 is a sectional view taken along line C-C of FIG. 7.
Figure 11:
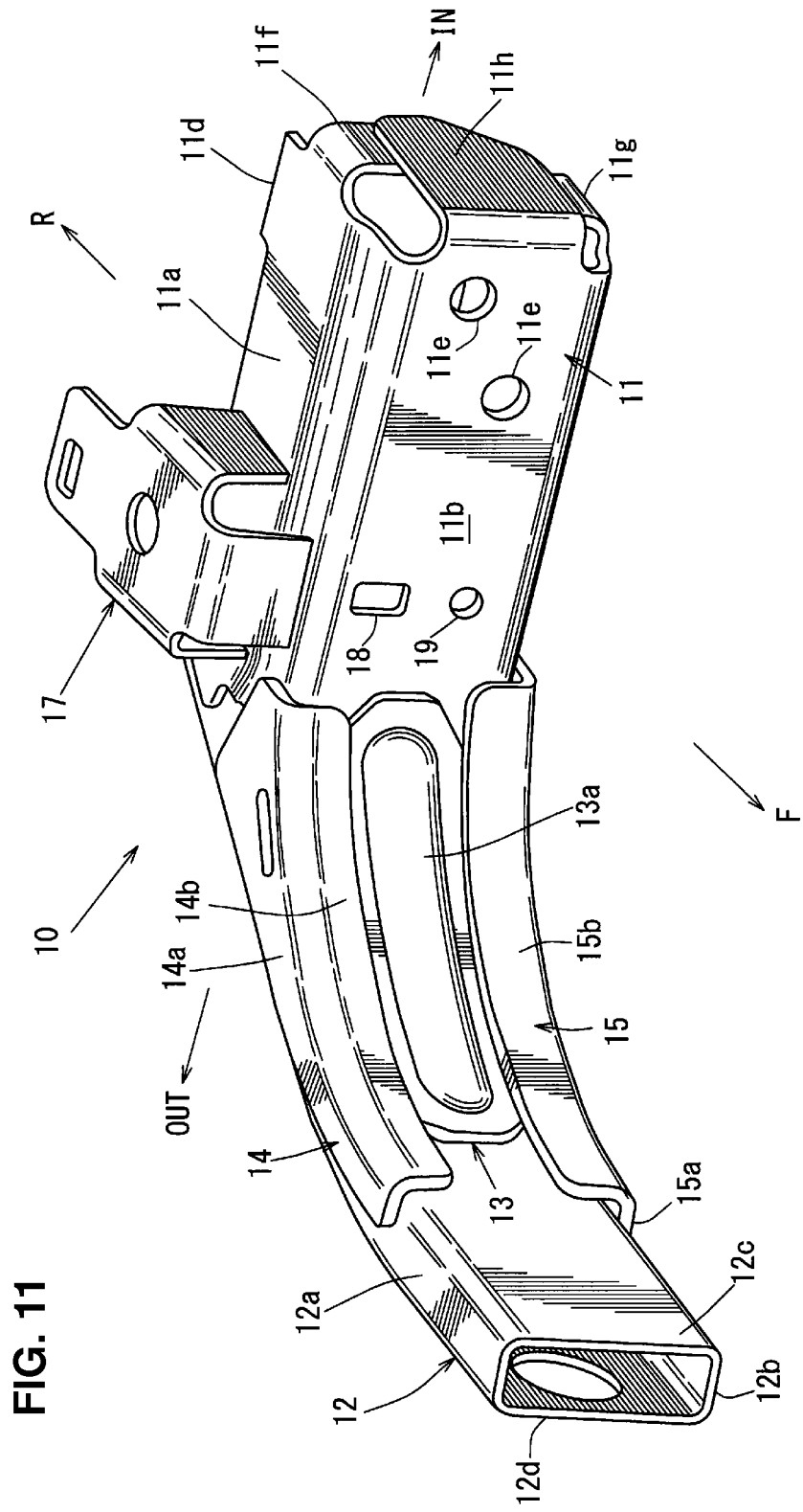
FIG. 11 is a perspective view of the link bracket.
Figure 12:
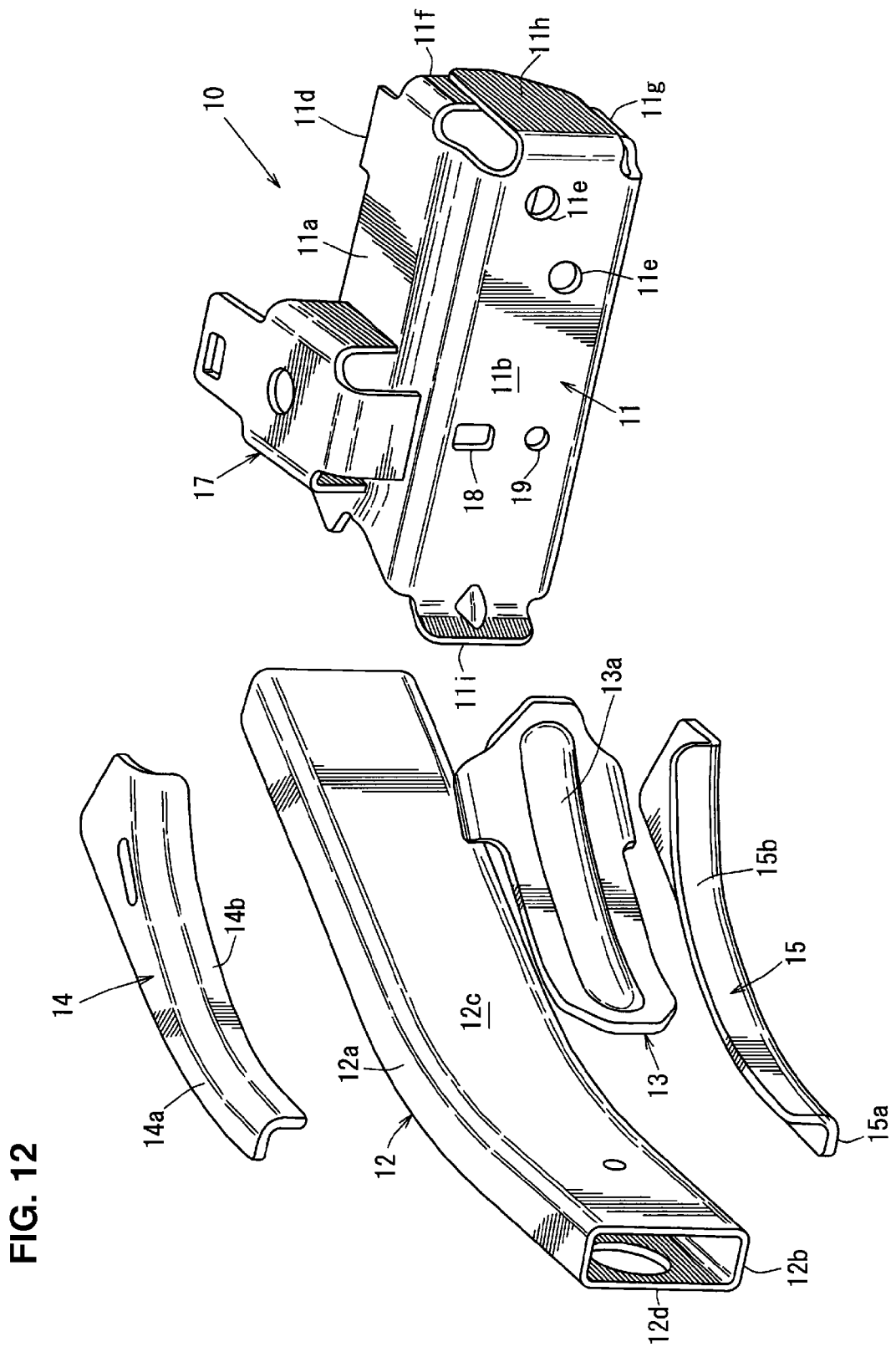
FIG. 12 is an exploded perspective view of the link bracket.

FIG. 7 is an elevational view showing a related structure of the cross bar, the guard bar, the link bracket and a steel bracket, FIG. 8 is a sectional view taken along line A-A of FIG. 7, FIG. 9 is a sectional view taken along line B-B of FIG. 7, FIG. 10 is a sectional view taken along line C-C of FIG. 7, FIG. 11 is a perspective view of the link bracket, and FIG. 12 is an exploded perspective view of the link bracket.

As shown in FIGS. 7 and 8, the cross bar 20 has cut-out portions 20A at its both-end portions (its right-side end portion is illustrated only in FIGS. 7 and 8). This cut-out potion 20A is formed by cutting off par of a rear face of the end portion of the cross bar 20. Further, the link bracket 10 connected to the center pillar 7 through the cut-out portion 20A is inserted into and fixed to the inside of the cross section, i.e., the main closed-cross section s1, of the cross bar 20.

As shown in FIGS. 11 and 12, the above-described link bracket 10 is made of plural members. That is, the link bracket 10 comprises a connection portion 11 which extends in the vehicle width direction, a link bracket outer 12 which extends substantially in the vehicle longitudinal direction, a set bracket inner 13 which contacts and is fixed to an inward face of the link bracket outer 12, a set bracket upper 14 which contacts and is fixed to respective inward sides and upper sides of the link bracket outer 12 and the set bracket inner 13, and a set bracket lower 15 which contacts and is fixed to respective inward sides and lower sides of the link bracket outer 12 and the set bracket inner 13, which are united as shown in FIG. 11.

The above-described connection portion 11 is, as shown in FIGS. 11, 12 and 17, formed by connecting the upper face 11a, the front face 11b, and the lower in a U shape and also by providing projection pieces 11d, 11d projecting rearward at two points of a rear end of the upper face 11a. Herein, plural, two, for example, bolt through holes He, He are formed at an inward side of the front face 11b of the connection portion 11.

Further, an anchor attaching member 17 which has a U-shaped cross section and the high rigidity is fixed to an outward side of the upper face 11*a* of the connection portion 11. An opening portion 18 for engaging a retractor attaching bracket 71, which will be described later (see FIG. 13), and a bolt through hole 19 for fastening the retractor attaching bracket 71 (see FIG. 13) are formed at the front face 11*b* of the connection portion 11 so as to face the above-described anchor attaching member 17 vertically. Additionally, at the inward end portion of the upper face 11*a* of the connection portion 11 is integrally formed a downward bending piece 11*f* which extends downward from this inward end portion, at the inward end portion of the lower face 11*c* of the connection portion 11 is integrally formed a upward bending piece 11*g* which extends upward from this inward end portion, at the inward end portion of the front face 11*b* of the connection portion 11 is integrally formed a rearward bending piece 11*h* which extends rearward from this inward end portion, and at the outward end portion of the front face 11*b* of the connection portion 11 is integrally formed a forward bending piece 11*i* which extends forward from this outward end portion.

Further, as shown in FIGS. 11 and 12, the above-described link bracket outer 12 includes an upper face portion 12*a*, a lower face portion 12*b*, and inward and outward side face portions 12*c*, 12*d*, and is formed in a rectangular tubal shape. The set bracket inner 13 has a longitudinal reinforcing bead 13*a* formed integrally thereat. The set bracket upper 14 includes an upper face portion 14*a* and a side face portion 14*b* and is formed to have an inverse-L-shaped cross section. The set bracket lower 15 includes a lower face portion 15*a* and a side face portion 15*b* and is formed to have an L-shaped cross section.

[Structure of Junction Member]

As shown in FIGS. 4, 6-10, the above-described junction member 50, which is made from aluminum or aluminum alloy, comprises an attachment face 51 which is fastened to the upper face portion 21 of the cross bar 20, a vertical face 52 as a reinforcement portion which is fastened together with the link bracket 10 and the cross bar 20, and a falling-prevention portion 53 which extends upward from a rear portion of the attachment face 51 where the outward end portion 42 of the guard bar 40 is attached, which are united.

Herein, at respective middle portions of the attachment portion 51 and the vertical face 52 is formed a protrusion portion 54 continuously to the both 51, 52 so that an upper face of the protrusion portion 54 can ensure the downward-projection amount of the outward end portion 42 of the guard bar 40 which projects downward from the protrusion portion 54, in particular. The above-described falling-prevention portion 53 is configured to contact the rear face of the outward piece 44 of the guard bar 40 so that the rearward leaning of the guard bar 40 caused by the input load in the vehicle's rollover can be prevented.

[Related Structure of Link Bracket and Cross Bar]

As shown in FIG. 7, the above-described link bracket 10 is connected to the cross bar 20 at its inward end portion, utilizing the cut-out portion 20A. An outward end portion of the link bracket 10 is fixed to the center pillar 7 as a side panel, specifically to the center pillar inner 8, via the spacer bracket 16 as shown in FIG. 1. The link bracket 10 is configured to pass through (penetrate) the cross bar 20 up to a position which overlaps the outward end portion 42 of the guard bar 40 in the plan view as shown in FIG. 7.

Figure 6:
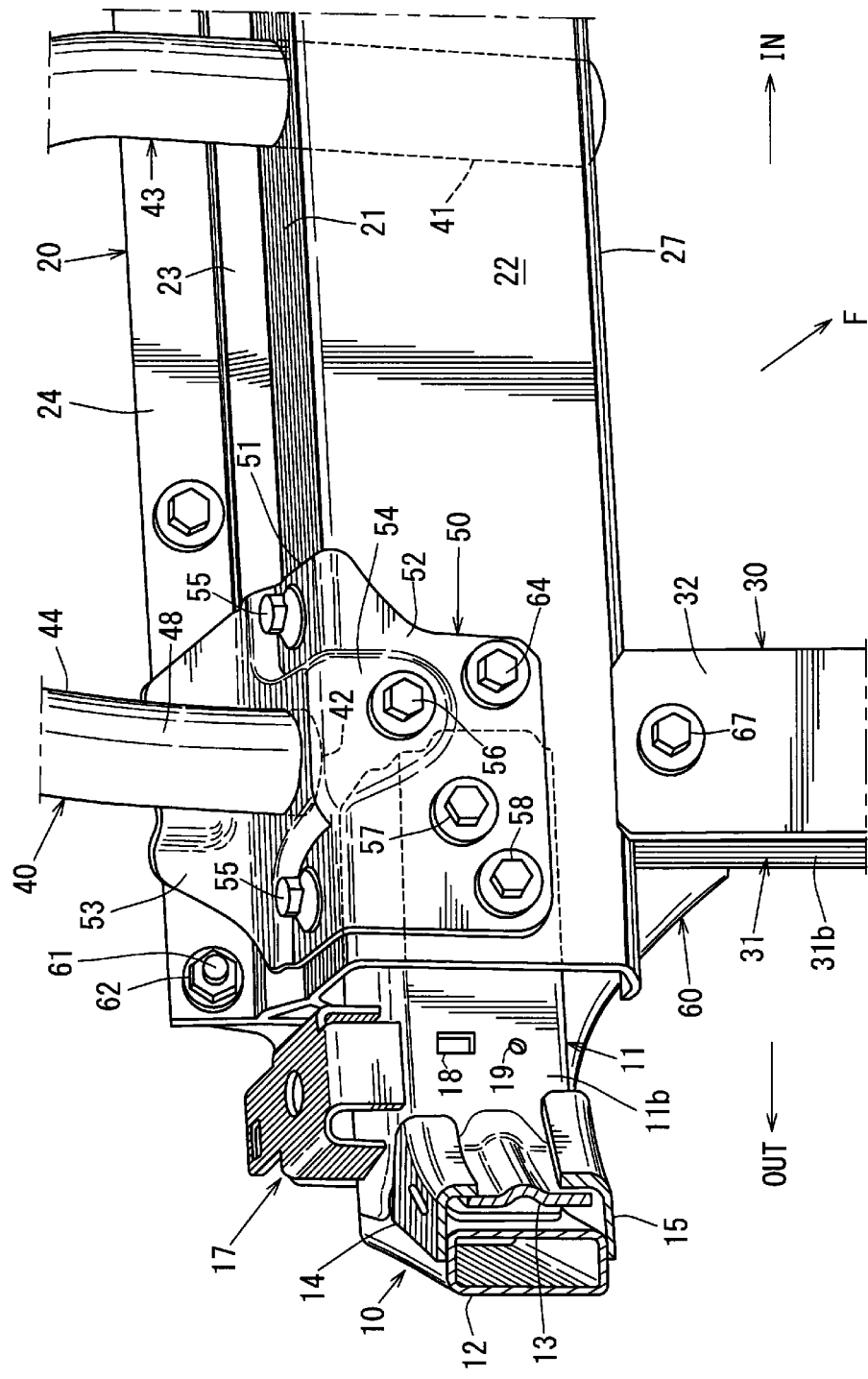
FIG. 6 is a perspective view showing the major portion, when viewed from vehicle's right and front side.

Meanwhile, as shown in FIGS. 6 and 7, the attachment face 51 of the junction member 50 is fixedly fastened to the upper face portion 21 of the cross bar 20 by using a pair of fastening members 55, 55 comprised of bolts and nuts. As shown in FIGS. 6, 9 and 10, the vertical face 52 of the junction member 50 is fixedly fastened to the front face portion 22 of the cross bar 20 by using plural fastening members 56, 57, 58 comprised of bolts and nuts. Herein, as shown in FIGS. 6 and 10, two pairs of fastening members 57, 58 fasten three members together, i.e., the vertical face 52 as the reinforcement portion of the junction member 50, the front face 11*b* of the connection portion 11 at the link bracket 10, and the front face portion 22 of the cross bar 20. The plural fastening members 57, 58 are spaced apart from each other in the vehicle width direction. The bolts of the fastening members 57, 58 are inserted into the bolt through holes 11*e*, 11*e* shown in FIGS. 11 and 12.

Thus, the link bracket 10 connected to the center pillar 7 is inserted in the main closed-cross section s1 of the cross bar 20, and also this link bracket 10 is connected to the cross bar 20. Thereby, the load inputted to the cross bar 20 from the guard bar 40 in the vehicle's rollover is transmitted to the leg portion 30 and also to the center pillar 7 by way of the link bracket 10, so that the appropriate load dispersion can be achieved.

[Related Structure of Leg Portion, Cross Bar, Steel Bracket and Link Bracket]

Figure 5:
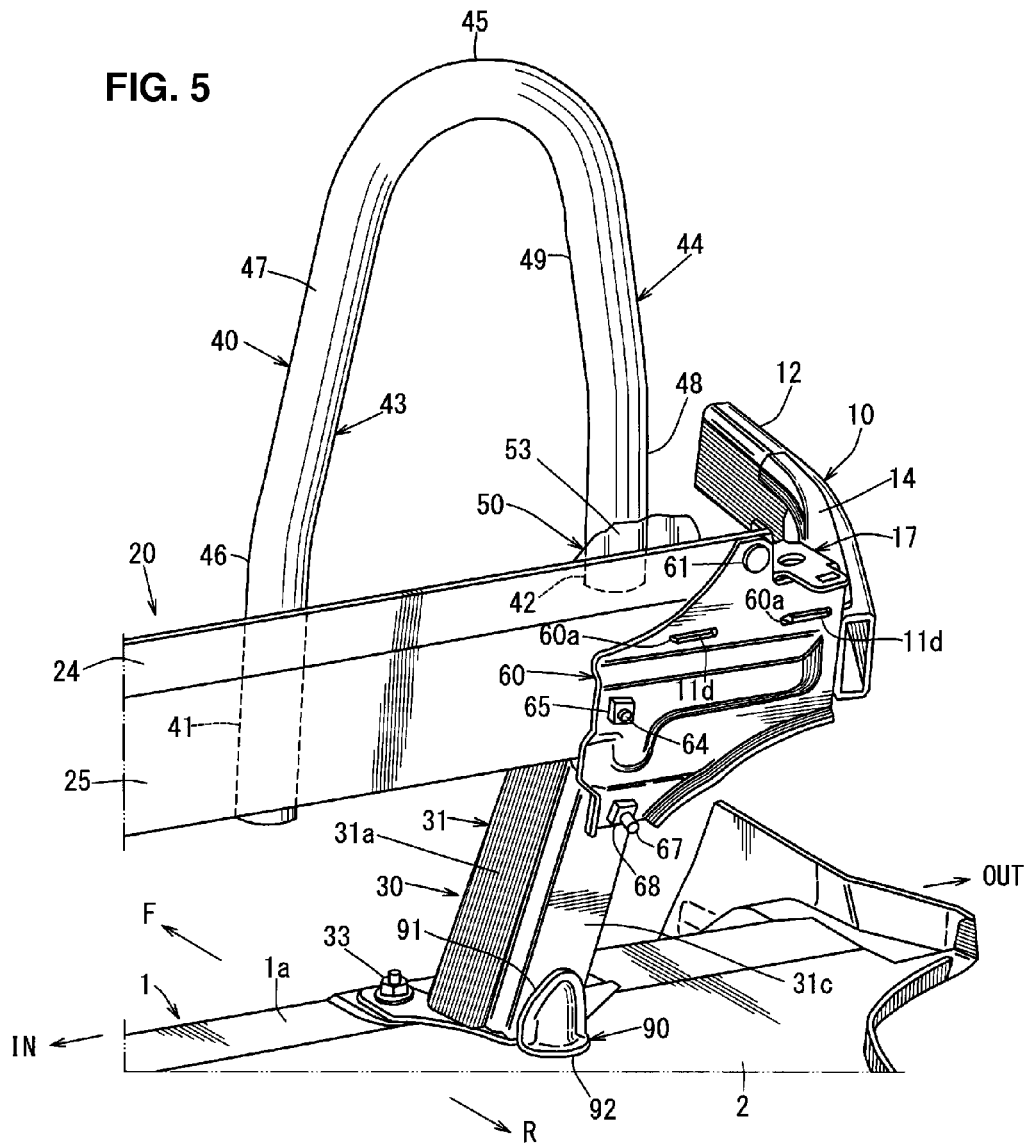
FIG. 5 is a perspective view showing the major portion, when viewed from vehicle's rear.

Herein, as shown in FIGS. 3 and 5, the above-described leg portion 30 is made from aluminum or aluminum alloy, and as shown in FIG. 5, the leg portion 30 is fixed to a lower portion of the cross bar 20 at a position in the vehicle width direction where the outward end portion 42 of the guard bar 40 is fixed to the cross bar 20. And, as shown in the same figure, there is provided a steel bracket 60 to connect the leg portion 30 and the cross bar 20 vertically on a back side. Herein, the above-described steel includes both of carbon steel containing carbon of 0.03-1.7 wt % and special steel containing other elements, such as Ni, Mn and Cr.

Since the above-described steel bracket 60 is provided, even in the seatback bar structure made from aluminum or aluminum alloy which has an earlier deformation starting time than steel (Young's modulus of aluminum is about ⅓ of that of steel) when the load inputted to the guard bar 40 in the vehicle's rollover or the like is transmitted to the rear floor 2 by way of the cross bar 20 and the leg portion 30, the deformation of the seatback bar can be retrained properly. Also, the input load to the guard bar 40 is directly transmitted to the leg portion 30 by way of the steel bracket 60, so that a reactive force can be generated continuously from an early stage.

The cut-out portion 20A is formed at the rear face of the end portion of the cross bar 20 as shown in FIG. 7, so that a position of the cut-out portion 20A has an open cross section, not a closed cross section. Then, the above-described steel bracket 60 is arranged to cover the cut-out portion 20A as shown in FIG. 7, and to form a closed cross section s4 together with the cross bar 20 and the link bracket 10 at the position of the cut-out portion 20A as shown in FIG. 8.

Thereby, the load generated in the vehicle's rollover can be supported at the closed cross section s4, and the load-transmission function for the vehicle's side collision can be improved. The above-described leg portion 30 comprises a leg-portion body 31 which is formed to have a U-shaped cross section and an open face directed forward and a plate 32 which is attached to the leg-portion body 31, covering its open face (see FIGS. 14, 15 and 16).

An upper portion of the steel bracket 60 is connected to a back face of the upper piece portion 24 of the cross bar 20 by a fastening member, such as a bolt 61 and a nut 62, as shown in FIG. 8.

A middle portion, in the vertical direction, of the steel bracket 60 is, as shown in FIG. 8, connected to the cross bar

20 by a fastening member, such as bolt 64 and nut 65, in a state in which a collar 63 is interposed between the front face portion 22 of the cross bar 20 and a front face of the steel bracket 60. At this connection position are fixedly fastened together the front face portion 22 of the cross bar 20 and the vertical face 52 of the junction member 50.

As shown in FIG. 10, a lower portion of the steel bracket 60 is connected to a back-face side of the leg-portion body 31 by a fastening member, such as a bolt 67 and a nut 68, in a state in which a collar 66 is interposed between the plate 32 of the leg portion 30 and a front face of the lower portion of the steel bracket 60.

As shown in FIG. 5, the steel bracket 60 has engagement holes 60a, 60a for engaging the two projection pieces 11d, 11d formed at the connection portion 11 of the link bracket 10 shown in FIGS. 11 and 12. The projection pieces 11d, 11d are inserted into the engagement holes 60a, 60a and engaged together, and then the both 60a, 11d are fixedly welded together.

[Support Structure of Retractor and Belt Anchor]

Figure 13:
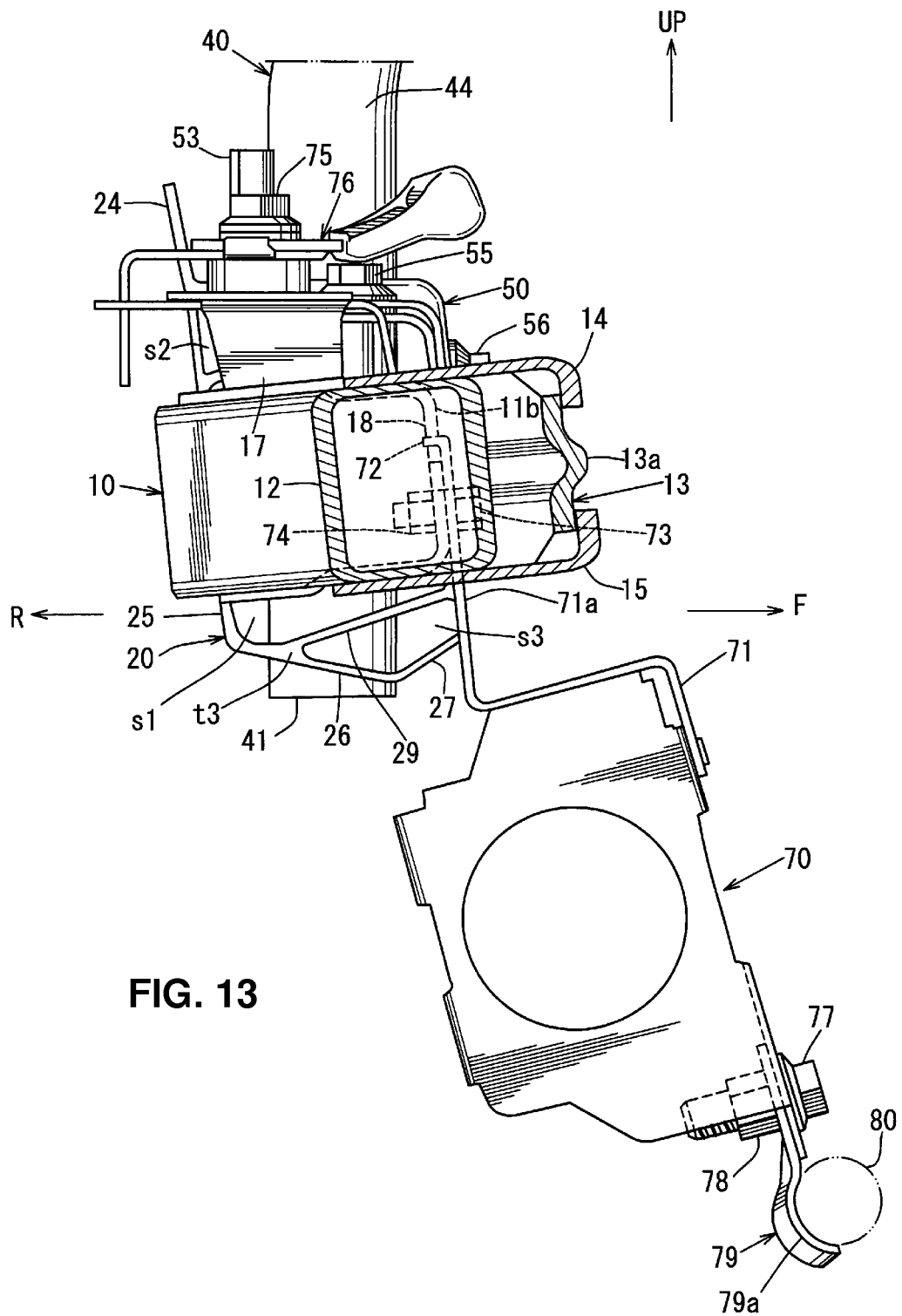
FIG. 13 is a sectional view taken along line Y-Y of FIG. 1.

FIG. 13 is a sectional view taken along line Y-Y of FIG. 1. As shown in FIGS. 1 and 13, a retractor 70 of a seatbelt device is provided at an outward side, in the vehicle width direction, of the leg portion 30. This retractor 70, which can restrain a passenger seated in a driver's seat or a passenger's seat (only one seat is illustrated in the figures) by using a seatbelt (not illustrated), is fixed to the link bracket 10. That is, the retractor 70 includes a bracket 71 which is of a substantially Z shape in the side view, and a vertically-extending upper portion 71a of the bracket 71 faces and contacts the front face 11b of the connection portion 11 of the link bracket 10 and a rearward-bending tongue piece 72 which is formed at an upper end of the upper portion 71a is inserted into the opening portion 18 of the connection portion 11 shown in FIG. 11 for engagement.

Further, as shown in FIG. 13, the upper portion 71a positioned just below the rearward-bending tongue piece 72 is fixedly fastened to the connection portion 11 of the link bracket 10 by using a bolt 73 inserted into the bolt through hole 19 shown in FIG. 11 and a nut 74.

As shown in FIGS. 7, 11 and 13, a seatbelt anchor 76 of the seatbelt is attached to the anchor attaching member 17 attached to the link bracket 10 by a fastening member 75, such as bolt and nut. The retractor 70 and the belt anchor 76 are attached by the same member, i.e., the link bracket 10. Accordingly, the distance between the retractor 70 and the belt anchor 76 is properly shortened, so that extending of the seatbelt (i.e., webbing) can be restrained and performances of webbing's withdrawing/winding can be improved. Also, the link bracket 10 itself is a rigidity member connecting the center pillar 7 and the cross bar 20, so that particularly reinforcing may be unnecessary for ensuring the support strength of the retractor 70 and therefore the weight increase of the vehicle body can be restrained.

As shown in FIGS. 1 and 13, there is provided a connecting pipe 80 as a connecting member to connect the center pillar inner 8 of the center pillar 7 and the leg portion 30 in the vehicle width direction, and the above-described retractor 70 is supported at the connecting pipe 80.

That is, a connecting bracket 79 is fixedly fastened to a lower portion of a front face of the retractor 70 by a fastening member of a bolt 77 and a nut 78 as shown in FIG. 13. A portion of the connecting bracket 79 which corresponds to the connecting pipe 80 is bent in an arc shape, thereby formed as a bending portion 79a. This bending portion 79a is fixed to a back face portion of the connecting pipe 80. The above-described retractor 70 is supported at the connecting pipe 80 as described above, so that the support strength of the retractor 70 can be further improved.

As shown in FIG. 1, a portion of the retractor 70, i.e., an inward-side portion of the retractor 70, is arranged at a position which overlaps the cross bar 20 in the plan view. And, a bottom face of the cross bar 20 which corresponds to this overlapping area forms the front bottom face portion 27 as a slant face which is spaced apart from the retractor 70. The front bottom face portion 27 constitutes the slant face which slants such that the level of its front portion is high and the level of its rear portion is low.

That is, it is necessary to restrain the passenger by using the webbing of the seatbelt device in the vehicle's side collision, so that it is preferable that the retractor 70 be arranged as inward in the vehicle width direction as possible. Then, the front bottom face portion 27 which slants as described above is provided, the retractor 70 and the cross bar 20 are arranged to overlap each other in the plan view, and the retractor 70 is located at the inward position, without interfering with other components.

[Related Structure of Leg Portion and Connecting Member]

Figure 14:
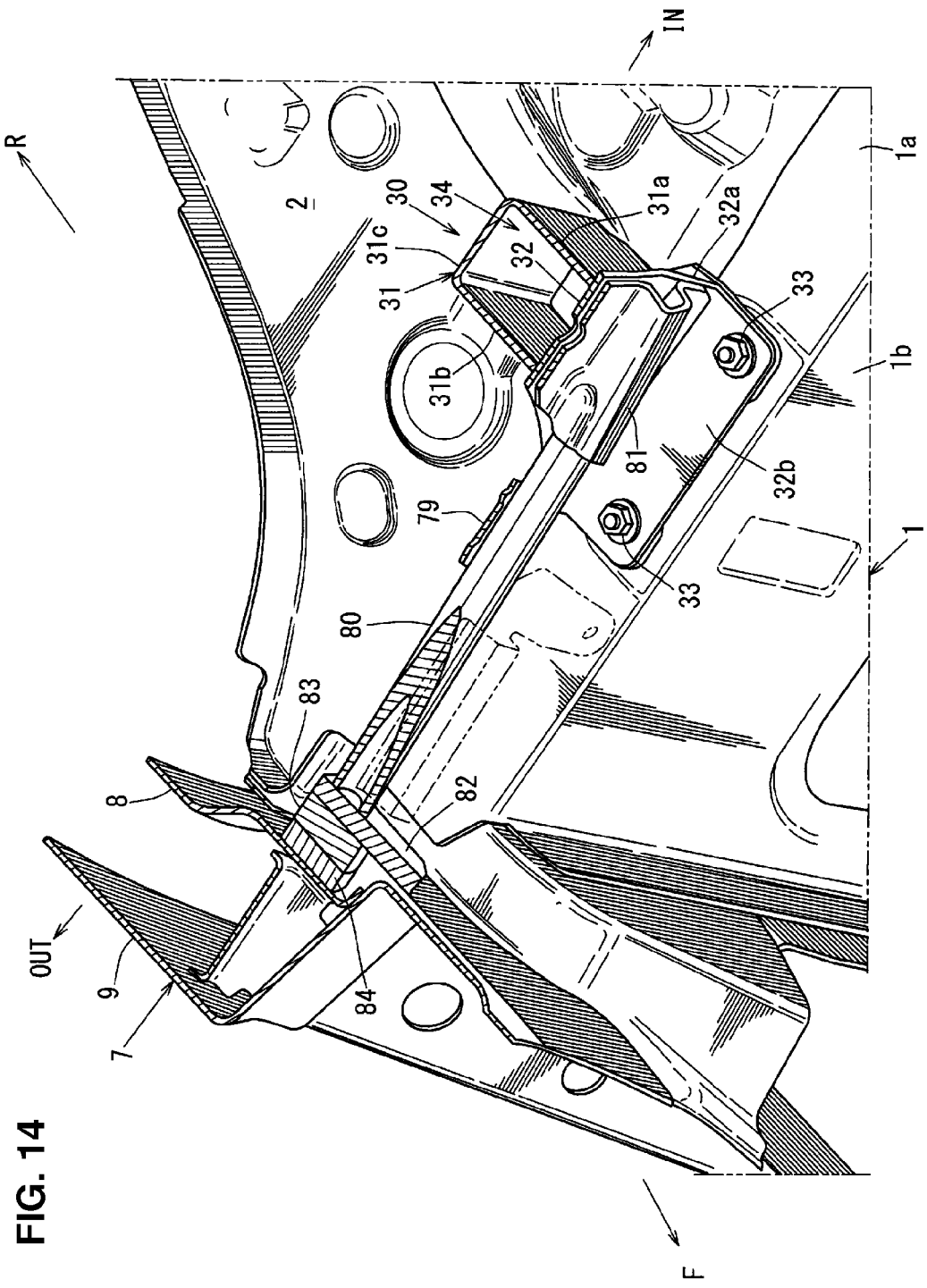
FIG. 14 is a perspective sectional view taken along line Z-Z of FIG. 1.
Figure 15:
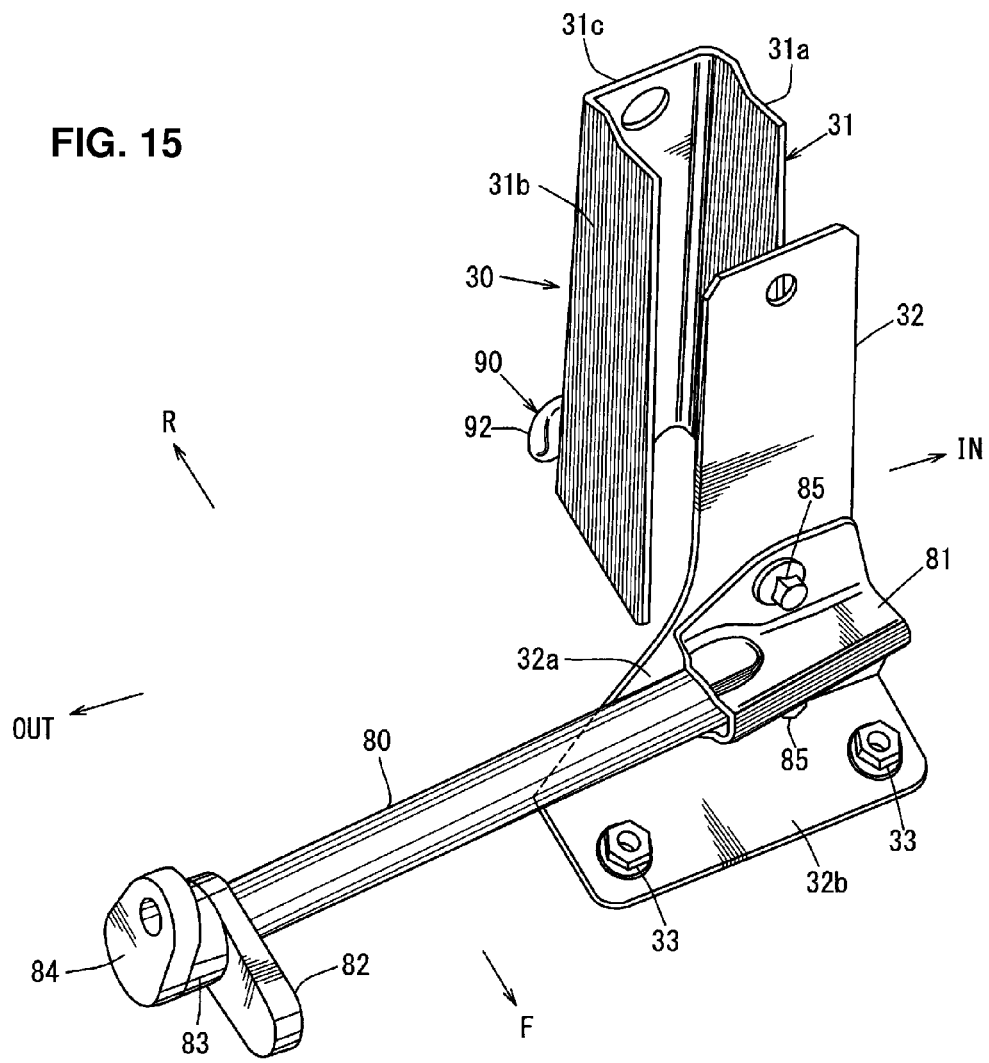
FIG. 15 is an exploded perspective view showing a leg portion and a connecting member.
Figure 16:
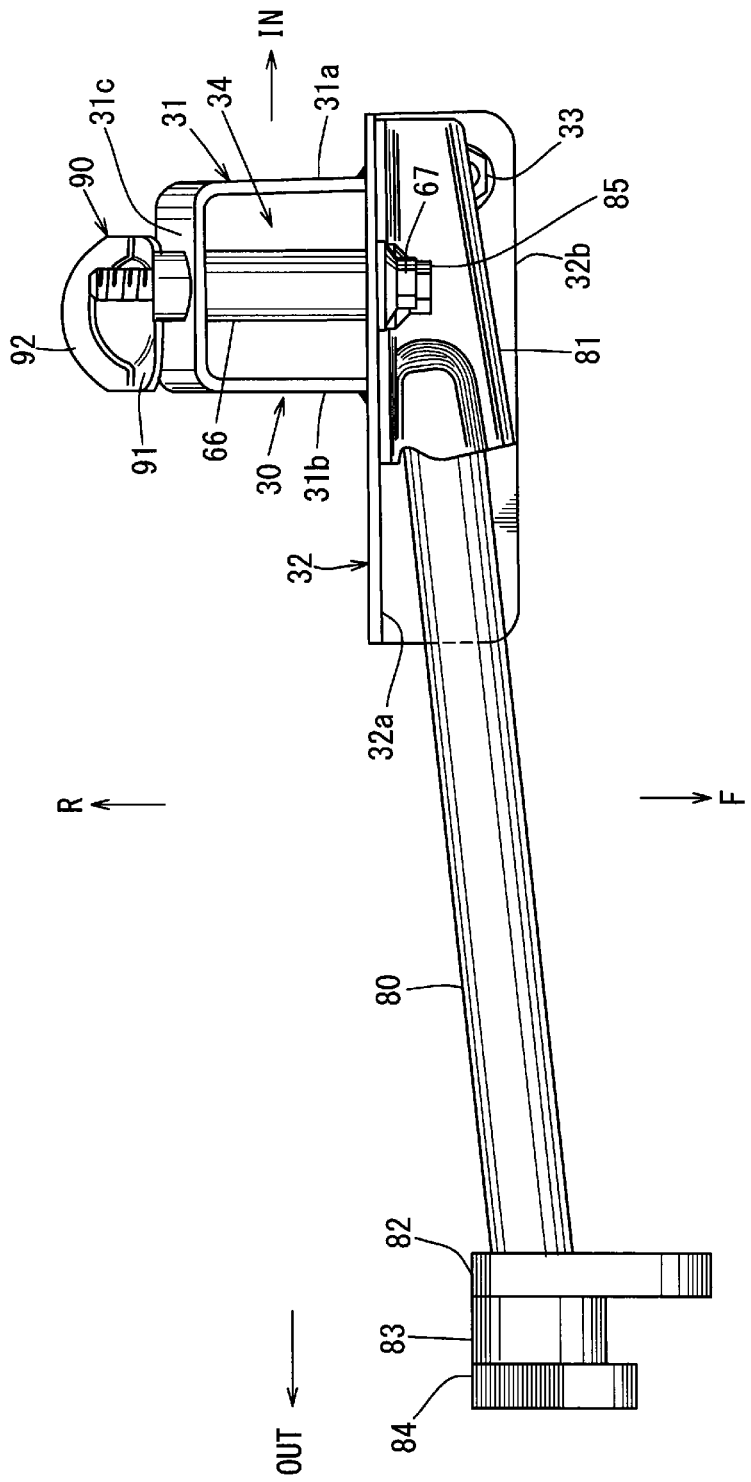
FIG. 16 is a plan view showing a related structure of the leg portion and the connecting member.

FIG. 14 is a perspective sectional view taken along line Z-Z of FIG. 1, FIG. 15 is an exploded perspective view showing the leg portion and the connecting member (connecting pipe 80), and FIG. 16 is a plan view showing a related structure of the leg portion and the connecting member (connecting pipe 80).

As shown in FIGS. 14-16, the above-described leg portion 30 comprises the leg-portion body 31 and the plate 32, and the leg-portion body 31 comprises an inward side face portion 31a, an outward side face portion 31b, and a back face portion 31c. The leg-portion body 31 is formed to have a U-shaped cross section in the plan view, and its opening face is directed forward. The above-described plate 32 covers the opening face of the leg-portion body 31 from the front, and this plate 32 and front end portions of the both side face portions 31a, 31b of the leg-portion body 31 are fixedly welded to each other along their longitudinal direction so that a closed cross section 34 is formed between the plate 32 and the leg-portion body 31. Further, the plate 32 has an expanding wide portion 32a at its lower portion. The expanding wide portion 32a is configured to extend downward of the retractor 70 and such that its width expands in the vehicle width direction. The lower portion of the plate 32 has an attachment seat face 32b which extends forward from a lower end of the expanding wide portion 32a is formed integrally thereat.

As shown in FIGS. 3 and 14, the attachment seat face 32b of the plate 32 is fixedly fastened to the upper face portion 1a of the bulkhead 1 which corresponds to the closed cross section 6 of the rear cross member 5 by using two pairs of fastening members 33, 33, such as bolts and nuts.

Further, as shown in FIGS. 14 and 15, the connecting pipe 80 is fixed to the lower portion, i.e., the expanding wide portion 32a, via a bracket 81 having a hat-shaped cross section. It may be preferable that the above-described connecting pipe 80 be arranged straightly in the vehicle width direction. In the embodiment, however, a longitudinal position of the center pillar 7 and a longitudinal position of the leg portion 30 do not match each other due to the particular vehicle-body structure of the embodiment, so the connecting pipe 80 is arranged such that its outward side is located forward and its inward side is located rearward.

As shown in FIGS. 14-16, an outward end portion, in the vehicle width direction, of the connecting pipe 80 is fixed to the center pillar inner 8 of the center pillar 7, and an inward end portion, in the vehicle width direction, of the connecting pipe 80 is fixed to the above-described bracket 81. Further, as shown in FIGS. 3 and 15, the bracket 81 is fixedly fastened to a front face of the expanding wide portion 32a of the plate 32 by using a fastening member, such as a pair of upper-and-lower bolts 85 and nuts 86.

Also, as shown in FIGS. 14 and 16, the bracket 81 is provided to extend inward of the leg-portion body 31 of the leg portion 30. That is, while a rotational moment is generated at the connecting pipe 80 which is provided obliquely relative to the vehicle width direction when the load is inputted from the outward side in the vehicle's side collision or the like, the above-described rotational moment is restrained at the inward end portion of the bracket 81 by configuring the bracket 81 to extend inward of the leg-portion body 31. Consequently, the input load from the connecting pipe 80 is efficiently transmitted to the rear floor 2 corresponding to the rear cross member 5 via the leg portion 30. Moreover, by providing the expanding wide portion 32a to avoid the retractor 70, the load inputted to the leg portion 30 via the guard bar 40 and the cross bar 20 in the vehicle's rollover is efficiently transmitted to the rear floor 2.

[Gusset and Its Surrounding Structure]

As shown in FIGS. 3, 5 and 16, a gusset 90 to prevent the leg portion 30 from falling down is provided at a rear portion of the leg portion 30. The gusset 90 comprises an inverse-U shaped upper flange 91 and an arc shaped lower flange 92. As shown in FIG. 3, the upper flange 91 is fixedly fastened to a back face of the leg-portion body 31, the lower flange 92 is fixedly fastened to an upper face of the rear floor 2, and a closed cross section 93 is formed by the leg-portion body 31, the rear floor 2, and the gusset 90. Since these members 40, 20, 30 are arranged in the bending shape in the side view, it can be prevented that the leg portion 30 falls down rearward by the input load in the vehicle's rollover.

As shown in FIG. 2, the leg portion 30 and the gusset 90 vertically correspond to the rear side frame 3 having the closed cross section 4. Herein, in the figures, an arrow F shows a vehicle's forward direction, an arrow R shows a vehicle's rearward direction, an arrow IN shows a vehicle's inward direction, an arrow OUT shows a vehicle's outward direction, and an arrow UP shows a vehicle's upward direction. While the vehicle's right side structure has been described mainly for the above-described embodiment, the vehicle has substantially a symmetrical structure in the seatback bar structure.

As described above, in the seatback bar structure which has the vehicle body provided with the side panels (see the center pillars 7) constituting the right-and-left vehicle-body side walls and the floor panel (see the rear floor 2) arranged between the right-and-left side panels (the center pillars 7), interconnecting the side panels (the center pillars 7), and forming the vehicle floor face, the seatback bar structure of a vehicle of the above-described embodiment comprises the cross bar 20 extending in the vehicle width direction above the floor panel (the rear floor 2), the leg portion 30 connecting the cross bar 20 and the floor panel (the rear floor 2), the guard bar 40 fixed to the upper portion of the cross bar 20, the guard bar 40 being made from aluminum or aluminum alloy by extrusion molding, and the link bracket 10, one end of which is fixed to the side panel (the center pillar 7) and the other end of which is connected to the cross bar 20, wherein the guard bar 40 has the inverse-U shape, and the inward end portion 41, in the vehicle width direction, thereof is configured to pass through the cross bar 20 and be welded to the cross bar 20 and the outward end portion 42, in the vehicle width direction, thereof is fixed to the cross bar 20 via the junction member 50, and the junction member 50 has the reinforcement portion (see the vertical face 52) which is fastened together with the link bracket 10 and the cross bar 20 (see FIGS. 1, 3, 6 and 10).

According to the above-described structure, since the inward end portion 41, in the vehicle width direction, of the guard bar 40 is configured to pass through the cross bar 20 and be welded to the cross bar 20 and the outward end portion 42, in the vehicle width direction, of the guard bar 40 is fixed to the cross bar 20 via the junction member 50, an appropriate attachment of the guard bar 40, considering the manufacturing accuracy of the extrusion molding of aluminum or aluminum alloy, can be achieved. Further, since the reinforcement portion (the vertical face 52) of the junction member 50 is fastened together with the link bracket 10 and the cross bar 20, the load inputted to the guard bar 40 in the vehicle's rollover can be transmitted from the guard bar 40 to the leg portion 30 by way of the junction member 50 and the cross bar 20, and also to the side panels (the center pillars 7) by way of the link bracket 10. Thus, load transmission both to the leg portion 30 and the side panels (the center pillars 7) can be conducted, so that appropriate load dispersion can be achieved.

Further, the junction member 50 has the falling-prevention portion 53 which extends upward from the rear portion of the attachment face 51 where the guard bar 40 is attached, and the falling-prevention portion is configured to contact a rear face of the guard bar (see FIGS. 6 and 10).

Thereby, when the load is inputted to the guard bar 40 in the vehicle's rollover, the guard bar 40 can be prevented from falling down rearward by the falling-prevention portion 53.

Moreover, the link bracket 10 is configured to pass through the cross bar 20 up to a position which overlaps the outward end portion 42, in the vehicle width direction, of the guard bar 40 in the plan view, and the reinforcement portion (see the vertical face 52) of the junction member 50, the cross bar 20, and the link bracket 10 are fastened at the plural fastening portions (see the fastening members 57, 58) spaced apart from each other in the vehicle width direction (see FIGS. 6, 7 and 10).

Thereby, since the reinforcement portion (the vertical face 52) of the junction member 50, the cross bar 20, and the link bracket 10 are fastened at the plural fastening portions (the fastening members 57, 58), the sufficient fastening strength of these three members can be ensured, so that the input load in the vehicle's rollover can be transmitted to the leg portion 30 and the link bracket 10 by way of the guard bar 40, the junction member 50, and the cross bar 20 so as to achieve the appropriate load dispersion and also the input load in the vehicle's side collision can be transmitted in an opposite direction in the vehicle width direction by way of the side panel (the center pillar), the link bracket 10, and the cross bar 20 so as to achieve the appropriate load dispersion.

The floor panel of the present invention corresponds to the rear floor 2 of the embodiment. Likewise, the side panel corresponds to the center pillar 7, the other end of the guard bar corresponds to the outward end portion 42 of the guard bar 40, the reinforcement portion corresponds to the vertical face 52, and the fastening portions correspond to the fastening members 57, 58. However, the present invention should not be limited to the above-described embodiment, and any other modifications or improvements may be applied within the scope of a sprit of the present invention. For example, while the link bracket 10 of the above-described embodiment is comprised of in total 5 members of the connection portion 11, the link bracket outer 12, the set bracket inner 13, the set bracket upper 14, and the set bracket lower 15, this link bracket 10 may be made of a member formed by hydro forming.

What is claimed is:

1. A seatback bar structure of a vehicle having a vehicle body provided with side panels constituting right-and-left vehicle-body side walls and a floor panel arranged between the right-and-left side panels, interconnecting the side panels, and forming a vehicle floor face, comprising:
   a cross bar extending in a vehicle width direction above the floor panel;
   a leg portion connecting the cross bar and the floor panel;
   a guard bar fixed to an upper portion of the cross bar, the guard bar being made from aluminum or aluminum alloy by extrusion molding; and
   a link bracket, one end of which is fixed to the side panel and the other end of which is connected to the cross bar,
   wherein said guard bar has an inverse-U shape, and an inward end portion, in the vehicle width direction, thereof is configured to pass through said cross bar and be welded to the cross bar and an outward end portion, in the vehicle width direction, thereof is configured not to pass through the cross bar but to welded to a junction member which is placed on and fixed to the cross bar, the junction member comprising a guard-bar attachment face portion to be fixed to an upper face portion of the cross bar and a vertical face portion to be fixed to a front face portion of the cross member, and
   the vertical face portion of said junction member is fastened together with said link bracket and the front face portion of said cross bar.

2. The seatback bar structure of the vehicle of claim 1, wherein said link bracket is configured to pass through said cross bar up to a position which overlaps the outward end portion, in the vehicle width direction, of said guard bar in a plan view, and the reinforcement portion of said junction member, the cross bar, and the link bracket are fastened at plural fastening portions spaced apart from each other in the vehicle width direction.

3. The seatback bar structure of the vehicle of claim 2, wherein said leg portion is fixed to a lower portion of said cross bar at a position in the vehicle width direction where the outward end portion of said guard bar is fixed to the cross bar, and a steel bracket to connect the leg portion and the cross bar is provided.

4. The seatback bar structure of the vehicle of claim 3, wherein said cross bar is made from aluminum or aluminum alloy by extrusion molding, the cross bar has a first rib which forms a thick portion at an interconnection portion with an upper face portion of the cross bar, partitions a substantially triangular closed-cross section from a main closed-cross section thereof, and fixes a rear portion of said guard bar at a position corresponding to said thick portion, and the cross bar further has a second rib which partitions the main closed cross section thereof vertically and forms a sub closed-cross section at a position corresponding to a fixation position of the leg portion.

5. The seatback bar structure of the vehicle of claim 2, wherein said cross bar is made from aluminum or aluminum alloy by extrusion molding, the cross bar has a first rib which forms a thick portion at an interconnection portion with an upper face portion of the cross bar, partitions a substantially triangular closed-cross section from a main closed-cross section thereof, and fixes a rear portion of said guard bar at a position corresponding to said thick portion, and the cross bar further has a second rib which partitions the main closed cross section thereof vertically and forms a sub closed-cross section at a position corresponding to a fixation position of the leg portion.

6. The seatback bar structure of the vehicle of claim 1, wherein said cross bar is made from aluminum or aluminum alloy by extrusion molding, the cross bar has a first rib which forms a thick portion at an interconnection portion with an upper face portion of the cross bar, partitions a substantially triangular closed-cross section from a main closed-cross section thereof, and fixes a rear portion of said guard bar at a position corresponding to said thick portion, and the cross bar further has a second rib which partitions the main closed cross section thereof vertically and forms a sub closed-cross section at a position corresponding to a fixation position of the leg portion.

7. A seatback bar structure of the vehicle having a vehicle body provided with side panels constituting right-and-left vehicle-body side walls and a floor panel arranged between the right-and-left side panels, interconnecting the side panels, and forming a vehicle floor face, comprising:
   a cross bar extending in a vehicle width direction above the floor panel;
   a leg portion connecting the cross bar and the floor panel;
   a guard bar fixed to an upper portion of the cross bar, the guard bar being made from aluminum or aluminum alloy by extrusion molding; and
   a link bracket, one end of which is fixed to the side panel and the other end of which is connected to the cross bar,
   wherein said guard bar has an inverse-U shape, and an inward end portion, in the vehicle width direction, thereof is configured to pass through said cross bar and be welded to the cross bar and an outward end portion, in the vehicle width direction, thereof is fixed to the cross bar via a junction member,
   said junction member has a reinforcement portion which is fastened together with said link bracket and said cross bar, and
   said junction member has a falling-prevention portion which extends upward from a rear portion of an attachment face thereof where said guard bar is attached, and said falling-prevention portion is configured to contact a rear face of said guard bar.

8. The seatback bar structure of the vehicle of claim 7, wherein said link bracket is configured to pass through said cross bar up to a position which overlaps the outward end portion, in the vehicle width direction, of said guard bar in a plan view, and the reinforcement portion of said junction member, the cross bar, and the link bracket are fastened at plural fastening portions spaced apart from each other in the vehicle width direction.

9. The seatback bar structure of the vehicle of claim 8, wherein said leg portion is fixed to a lower portion of said cross bar at a position in the vehicle width direction where the outward end portion of said guard bar is fixed to the cross bar, and a steel bracket to connect the leg portion and the cross bar is provided.

10. The seatback bar structure of the vehicle of claim 9, wherein said cross bar is made from aluminum or aluminum alloy by extrusion molding, the cross bar has a first rib which forms a thick portion at an interconnection portion with an upper face portion of the cross bar, partitions a substantially triangular closed-cross section from a main closed-cross section thereof, and fixes a rear portion of said guard bar at a position corresponding to said thick portion, and the cross bar further has a second rib which partitions the main closed cross section thereof vertically and forms a sub closed-cross section at a position corresponding to a fixation position of the leg portion.

11. The seatback bar structure of the vehicle of claim 8, wherein said cross bar is made from aluminum or aluminum alloy by extrusion molding, the cross bar has a first rib which forms a thick portion at an interconnection portion with an upper face portion of the cross bar, partitions a substantially triangular closed-cross section from a main closed-cross section thereof, and fixes a rear portion of said guard bar at a position corresponding to said thick portion, and the cross bar further has a second rib which partitions the main closed cross section thereof vertically and forms a sub closed-cross section at a position corresponding to a fixation position of the leg portion.

12. The seatback bar structure of the vehicle of claim 7, wherein said leg portion is fixed to a lower portion of said cross bar at a position in the vehicle width direction where the outward end portion of said guard bar is fixed to the cross bar, and a steel bracket to connect the leg portion and the cross bar is provided.

13. The seatback bar structure of the vehicle of claim 12, wherein said cross bar is made from aluminum or aluminum alloy by extrusion molding, the cross bar has a first rib which forms a thick portion at an interconnection portion with an upper face portion of the cross bar, partitions a substantially triangular closed-cross section from a main closed-cross section thereof, and fixes a rear portion of said guard bar at a position corresponding to said thick portion, and the cross bar further has a second rib which partitions the main closed cross section thereof vertically and forms a sub closed-cross section at a position corresponding to a fixation position of the leg portion.

14. The seatback bar structure of the vehicle of claim 7, wherein said cross bar is made from aluminum or aluminum alloy by extrusion molding, the cross bar has a first rib which forms a thick portion at an interconnection portion with an upper face portion of the cross bar, partitions a substantially triangular closed-cross section from a main closed-cross section thereof, and fixes a rear portion of said guard bar at a position corresponding to said thick portion, and the cross bar further has a second rib which partitions the main closed cross section thereof vertically and forms a sub closed-cross section at a position corresponding to a fixation position of the leg portion.

15. A seatback bar structure of the vehicle having a vehicle body provided with side panels constituting right-and-left vehicle-body side walls and a floor panel arranged between the right-and-left side panels, interconnecting the side panels, and forming a vehicle floor face, comprising:
  a cross bar extending in a vehicle width direction above the floor panel;
  a leg portion connecting the cross bar and the floor panel;
  a guard bar fixed to an upper portion of the cross bar, the guard bar being made from aluminum or aluminum alloy by extrusion molding; and
  a link bracket, one end of which is fixed to the side panel and the other end of which is connected to the cross bar,
  wherein said guard bar has an inverse-U shape, and an inward end portion, in the vehicle width direction, thereof is configured to pass through said cross bar and be welded to the cross bar and an outward end portion, in the vehicle width direction, thereof is fixed to the cross bar via a junction member,
  said junction member has a reinforcement portion which is fastened together with said link bracket and said cross bar, and
  said leg portion is fixed to a lower portion of said cross bar at a position in the vehicle width direction where the outward end portion of said guard bar is fixed to the cross bar, and a steel bracket to connect the leg portion and the cross bar is provided.

16. The seatback bar structure of the vehicle of claim 15, wherein said cross bar is made from aluminum or aluminum alloy by extrusion molding, the cross bar has a first rib which forms a thick portion at an interconnection portion with an upper face portion of the cross bar, partitions a substantially triangular closed-cross section from a main closed-cross section thereof, and fixes a rear portion of said guard bar at a position corresponding to said thick portion, and the cross bar further has a second rib which partitions the main closed cross section thereof vertically and forms a sub closed-cross section at a position corresponding to a fixation position of the leg portion.

* * * * *